United States Patent
McBurney et al.

(10) Patent No.: US 8,374,785 B2
(45) Date of Patent: Feb. 12, 2013

(54) TIGHTLY COUPLED GPS AND DEAD-RECKONING VEHICLE NAVIGATION

(75) Inventors: Paul W. McBurney, San Francisco, CA (US); Eric Hirsch, Munich (DE)

(73) Assignee: eRIDE, Inc., San Bruno, CA (US)

( * ) Notice: Subject to any disclaimer, the term of this patent is extended or adjusted under 35 U.S.C. 154(b) by 478 days.

(21) Appl. No.: 12/695,541

(22) Filed: Jan. 28, 2010

(65) Prior Publication Data

US 2011/0184644 A1   Jul. 28, 2011

(51) Int. Cl.
*G01S 1/00* (2006.01)
*G01S 5/02* (2010.01)
(52) U.S. Cl. ........................................ 701/472
(58) Field of Classification Search ............ 701/400, 701/408, 468, 469, 472, 473, 480, 483, 494, 701/495, 498, 500, 501
See application file for complete search history.

(56) References Cited

U.S. PATENT DOCUMENTS

| | | | |
|---|---|---|---|
| 5,257,195 A * | 10/1993 | Hirata | 701/472 |
| 5,307,277 A * | 4/1994 | Hirano | 701/472 |
| 5,416,712 A * | 5/1995 | Geier et al. | 701/472 |
| 5,434,788 A * | 7/1995 | Seymour et al. | 701/472 |
| 5,488,559 A * | 1/1996 | Seymour | 701/446 |
| 5,539,647 A * | 7/1996 | Shibata et al. | 701/472 |
| 5,828,585 A * | 10/1998 | Welk et al. | 702/96 |
| 5,877,723 A * | 3/1999 | Fan | 342/357.31 |
| 6,087,965 A * | 7/2000 | Murphy | 340/991 |
| 6,205,401 B1 * | 3/2001 | Pickhard et al. | 701/480 |
| 7,193,559 B2 * | 3/2007 | Ford et al. | 342/357.32 |
| 7,228,230 B2 * | 6/2007 | Hirokawa | 701/472 |
| 7,248,964 B2 * | 7/2007 | Bye | 701/469 |

* cited by examiner

*Primary Examiner* — Khoi Tran
*Assistant Examiner* — Nicholas Kiswanto
(74) *Attorney, Agent, or Firm* — Thomas E. Schatzel; Law Offices of Thomas E. Schatzel, P.C.

(57) ABSTRACT

A tightly coupled GPS and dead-reckoning system collects wheel speed transducer data over a vehicle's network to compute vehicle range and direction. The dead-reckoning bridges over gaps in navigation solutions that would otherwise occur when GPS signal transmission is lost in tunnels, parking garages, and other common situations. Continual calibration of the wheel radii and compensation for speed effects are calculated from GPS position fixes, and such improves the performance and accuracy of dead-reckoning during long outages of GPS signal reception. When the GPS signals are restored, the dead-reckoning solutions provide a high quality starting place for the GPS receiver to search around.

10 Claims, 8 Drawing Sheets

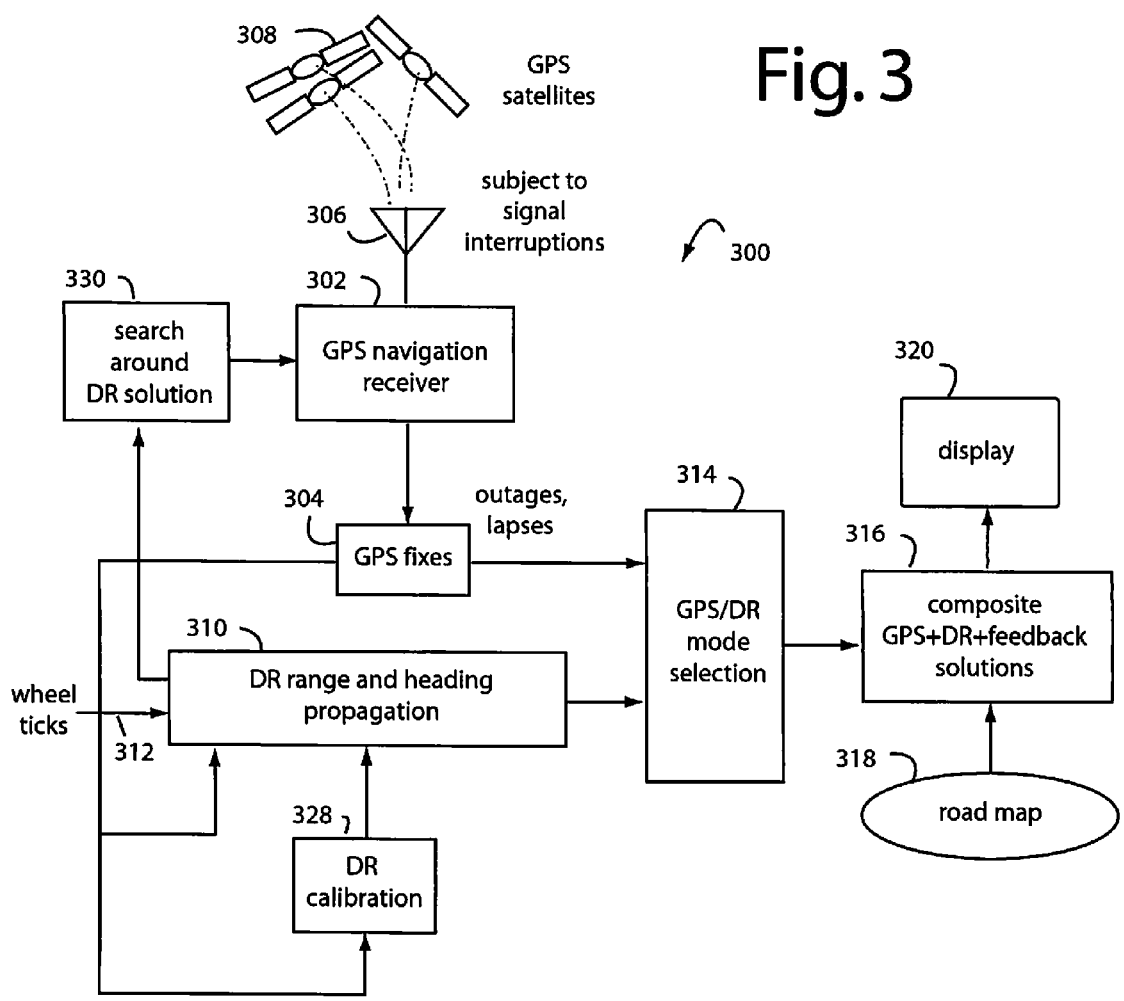

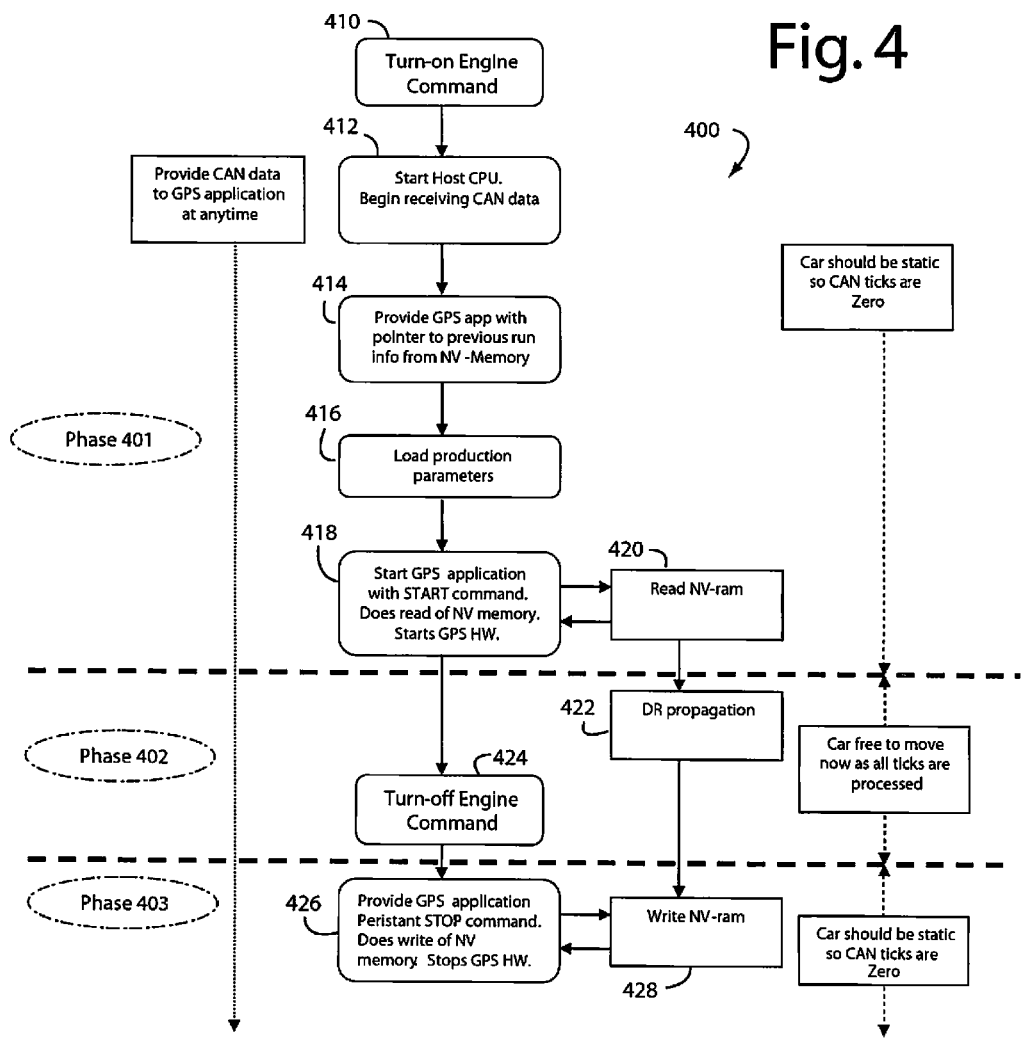

TIGHTLY COUPLED GPS AND DEAD-RECKONING VEHICLE NAVIGATION

BACKGROUND OF THE INVENTION

1. Field of the Invention

The present invention relates to vehicle navigation systems, and more particularly to road map correction feedback for tightly coupled combinations of global position system (GPS) receivers and dead-reckoning in vehicles.

2. Description of Related Art

GPS navigation systems with street map displays are now widely available in most new vehicles throughout the world. New map updates are purchased and installed with DVD disks, and seem to come out every year on an annual basis. The typical GPS navigation receiver used in these vehicles is accurate to tens of meters in good environments but can degrade to even a hundred meters in dense urban environments. These vehicle navigation systems assume the vehicle is traveling on the mapped roads, and therefore use the map information to snap the vehicle position icon to the exact path of the nearest road. But if GPS reception is lost, as commonly occurs in tunnels and parking garages, the user position on the map display screen will simply not update.

Factory-installed navigation systems are generally expected to provide higher reliability and accuracy compared to after-market portable navigation devices. Drivers will not accept long start-up times or navigation failures that result simply from driving into tunnels or parking garages. Conventional factory-installed navigation systems have therefore been connected to the speedometers, odometers, inertial sensors like gyros and accelerometers and vehicle data buses to access speed, forward/reverse, and distance traveled information. However, the inertial sensors impose a higher cost.

Getting any heading information in conventional systems has required that expensive and delicate, directly coupled automotive gyroscopes be installed. SiRF Technology (San Jose, Calif.) markets a solution they say eliminates this relatively expensive sensor, and instead uses sensor data already available from other vehicle subsystems. According to SiRF, the sensor-data measurements must be accurate enough to extract meaningful information for dead-reckoning, the sensor measurements must be provided with sufficient frequency, and any delays in sensor-data delivery to the dead-reckoning system must be short, e.g., under ten milliseconds latency.

Most new automobiles in North America and Europe are equipped with vehicle speed sensors, and anti-lock braking systems (ABS) as standard equipment. Compasses are more frequently found in the USA than in Europe, but stability control is more popular in Europe than in the USA. Such dead-reckoning software has to take into account the different availability of particular sensors. The earlier SiRFdrive 1.0 was configured for vehicle platforms with a directly coupled gyroscopes, and the later SiRFdrive 2.0 used distributed ABS-module sensor data instead. SiRFdrive 2.0 computes individual wheel speeds to determine vehicle 110 speed as well as its rotational velocity, so the expensive gyroscope could therefore be eliminated. The SiRFdrive 2.0 dead-reckoning system is described in press releases as collecting the wheel turning ticks, or speed pulses, from each wheel. It further determines the calibration values that it will need for precise dead-reckoning. The better the resolution of the wheel-tick data, e.g., the larger number of wheel pulses per revolution, the better will be the overall dead-reckoning performance.

Since wheel turning tick data are read directly from a vehicle bus, there was seen no need to connect to the wheel sensors themselves. However, using raw ABS data is not so easy. Dead-reckoning requires the highest resolution at low speeds, since the largest heading changes usually occur at lows speeds while rounding turns at road intersections. The main function of an ABS module is to control lockups of the individual wheels that occur when hard braking system is applied at high speed. So, some ABS modules do not send measurements at the full resolution they are capable of, and the wheel sensor ABS modules may output inaccurate or no data at all at the lowest speeds. In these instances, the ABS software can usually be upgraded to provide the necessary resolution and low-speed data outputs needed by dead-reckoning applications. Advertizing literature says the SiRFdrive 2.0 has advanced algorithms to minimize the adverse effect such data loss has on accuracy at low vehicle speeds.

Unfortunately, such wheel-tick driven dead-reckoning systems have not lived up to their promise. What is still needed is a practical system that combines GPS and dead-reckoning and that includes self-calibration and correction algorithms that really work.

SUMMARY OF THE INVENTION

Briefly, a tightly coupled GPS and dead-reckoning system embodiment of the present invention that collects wheel speed transducer data over a vehicle's network to compute vehicle range and direction. The dead-reckoning bridges over gaps in navigation solutions that would otherwise occur when GPS signal transmission is lost in tunnels, parking garages, and other common situations. Continual calibration of the wheel radii and compensation for speed effects are calculated from GPS position fixes, and such improves the performance and accuracy of dead-reckoning during long outages of GPS signal reception. When the GPS signals are restored, the dead-reckoning solutions provide a high quality starting place for the GPS receiver to search around.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 3 is a functional block diagram of a combined GPS and DR system embodiment of the present invention that can be implemented with various hardware and software, as in FIGS. 2A and 2B, for the system application shown in FIG. 1;

FIG. 4 is a phase diagram showing the startup, running, and ending phases of operation of the tightly coupled GPS and dead-reckoning system like those of FIGS. 1, 2A, and 2B;

DETAILED DESCRIPTION OF THE INVENTION

Figure 1:
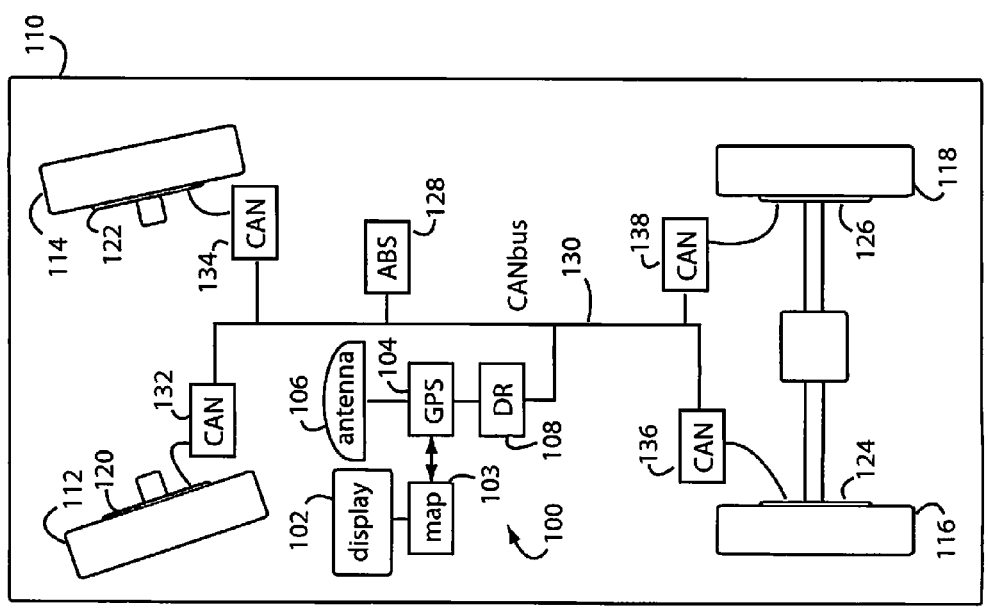
FIG. 1 is a function block diagram of a tightly coupled GPS and dead-reckoning system embodiment of the present invention for a four-wheel vehicle with a vehicle bus network.

FIG. 1 represents a GPS and dead-reckoning (DR) combination embodiment of the present invention, referred to herein by the general reference numeral 100. The GPS and dead-reckoning combination 100 provides navigation information on a display 102 to a user. A road map disk and player 103 display the current user position in relation to the local roads. A GPS receiver 104 tunes in and tracks microwave satellite transmissions through an antenna 106, and is tightly coupled with calibrated "delta-heading" and "delta-range" information calculated by a dead-reckoning (DR) computer 108. The "delta" term signifies how the heading, or direction, of a vehicle 110 has changed over time, and how the range, or distance has changed over the same period.

GPS receiver 104 provides data useful in calibrating the estimates propagated by DR computer 108. GPS receiver 104 provides absolute position and heading fixes, on which the DR computer 108 can add its calibrated delta-heading and delta-range computations to arrive at a dead-reckoning solution. The road map disk and player 103 provides road segment information for user display 102.

Figure 2A:
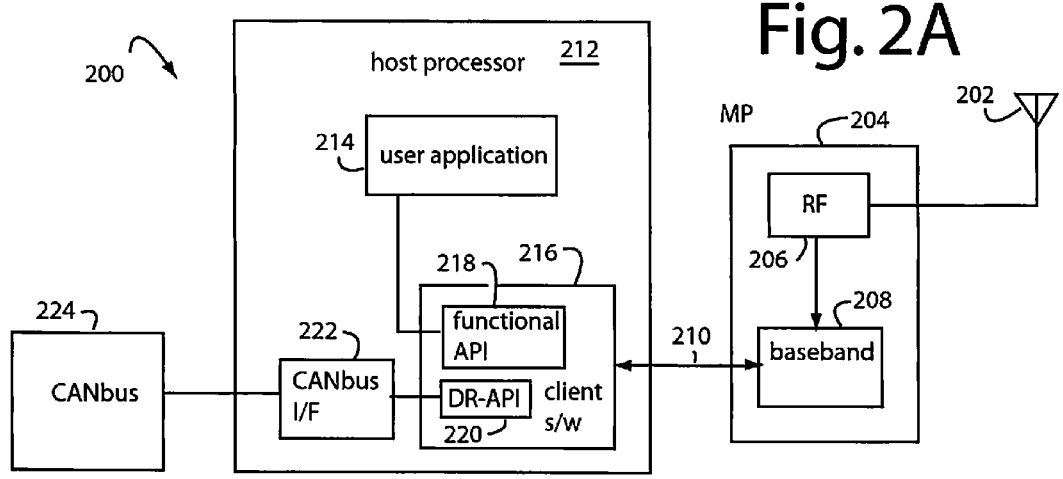
FIGS. 2A and 2B are functional block diagrams of two possible implementations of a combination GPS receiver and DR computer of FIG. 1.

The DR computer 108 will provide highly accurate dead-reckoning solutions that will not drift significantly when the GPS receiver has not provided a fix for quite some time and has lost all satellite tracking. The dead-reckoning solutions are further very useful in quickly reinitiating the GPS receiver 104 when signal reception is restored as the position uncertainty growth great is greatly reduced when DR is available when compared. This is because the DR can measure vehicle movement whereas the stand alone GPS receiver would have to assume a worst case movement for driving its position uncertainty which affects the amount of search of code and frequency searching FIGS. 2A and 2B suggest two ways GPS receiver 104 and DR computer 108 can be implemented. In FIG. 2A, orbiting navigation satellites transmit microwave signals that are received by an antenna 202 and demodulated by a navigation measurement platform (MP) 204, e.g., an eRide (San Francisco, Calif.) OPUS-III nanoRide GPS module with a serial output. MP 204 is a type where the navigation software is executed on a host processor, and includes a 32-channel radio frequency (RF) receiver 206, baseband 208, and SAW-filtering stages. The MP 204 is capable of two channel real-time differential GPS with satellite based augmentation system (SBAS). A serial interface 210 can be USB, RS-232, or similar line-based interface. A host processor 212 runs a user application 214 and has spare capacity to host a client software 216 comprising GPS, DR, and applications programming interface (API) libraries. A functional API 218 allows communication of the navigation solutions for display to the user, and a CANbus interface 222 accepts wheel-tick information from a CANbus 224.

Figure 2B:
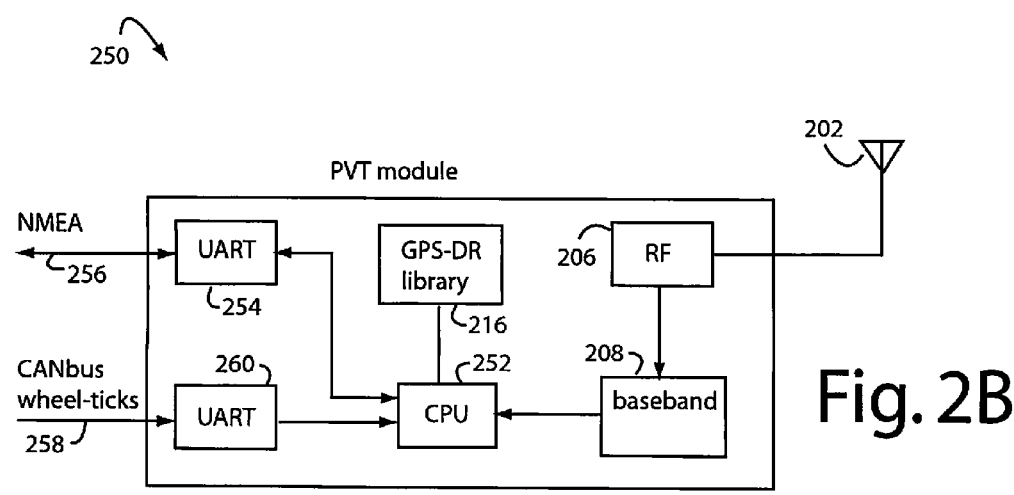

In FIG. 2B, GPS receiver 104 and DR computer 108 are implemented with a position, velocity, time (PVT) module 250. For example, an eRide (San Francisco, Calif.) ePV3600 can be used, which is a complete GPS/AGPS PVT receiver that includes an eRide OPUS III baseband processor with 44,000 effective correlators and combined with an ARM7TDMI-S®-based CPU with on-chip ROM and SRAM. Such can acquire and track signals down to −161 dBm and so can even operate indoors. The ePV3600 takes in a single low-IF input from an ePR3036 GPS-RF front-end chip, equivalent to RF stage 206 and baseband stage 208. An embedded microcontroller (CPU) 252 operates from external parallel flash memory, or from an on-chip ROM memory, or parallel flash memory. The device GPS firmware in library 216 handles acquisition, tracking, and position, velocity and timing data output. A UART 254 and a serial bidirectional interface 256 supports "NMEA" and serial interface protocols for interfacing to other applications. CANbus wheel-ticks 258 are received by another UART 260.

NMEA sentences include a first word called a data type, and it defines how the rest of the sentence is to be interpreted. The GGA sentence, Table-I, is an example for essential fix data. Other sentences may repeat some of the same information but will also supply new data. Any device that can read the data can screen for data sentences that it is interested in. There are no commands to control the GPS, it just sends all of the data it has even though much of it will be ignored. Listeners will compute their own checksums and ignore any data with incorrect checksums. The NMEA standard defines sentences for all kinds of devices used in marine applications. The sentences related to GPS receivers all start with "GP".

The so-called NMEA 0183 Standard uses a simple ASCII, serial communications protocol to define how data is transmitted in "sentences" from one "talker" to multiple "listeners". With intermediate expanders, talkers can transmit to a nearly unlimited number of listeners, and using multiplexers, multiple sensors can talk to a single computer port. Third-party switches are available that can establish a primary and secondary talker, with automatic failover if the primary fails. The standard defines the contents of each sentence (message) type in the host CPU applications Layer so that all listeners can parse messages accurately.

TABLE I

AAM - Waypoint Arrival Alarm
ALM - Almanac data
APA - Auto Pilot A sentence
APB - Auto Pilot B sentence
BOD - Bearing Origin to Destination
BWC - Bearing using Great Circle route
DTM - Datum being used.
GGA - Fix information
GLL - Lat/Lon data
GRS - GPS Range Residuals
GSA - Overall Satellite data
GST - GPS Pseudorange Noise Statistics
GSV - Detailed Satellite data
MSK - send control for a beacon receiver
MSS - Beacon receiver status information.
RMA - recommended Loran data
RMB - recommended navigation data for GPS
RMC - recommended minimum data for GPS
RTE - route message
TRF - Transit Fix Data
STN - Multiple Data ID
VBW - dual Ground/Water Speed
VTG - Vector track an Speed over the Ground
WCV - Waypoint closure velocity (Velocity Made Good)
WPL - Waypoint Location information
XTC - cross track error
XTE - measured cross track error
ZTG - Zulu (UTC) time and time to go (to destination)
ZDA - Date and Time In FIG. 1, vehicle 110 has two front, steerable wheels 112 and 114, and two rear, non-steering wheels 116 and 118. Note that for a given turn, the turning radius of the inside wheel has to be much smaller than the turning radius of the outside wheel. For that reason, it is not practical to derive heading and range information from the front steering wheels because the computations are complex and are dependent on the steering angle.

Each wheel in FIG. 1 is fitted with an antilock braking system (ABS) transducer 120, 122, 124, and 126. These transducers are sometimes called wheel speed sensors (WSS) and produce electronic pulses or "ticks" as the corresponding wheels are turned. Some such transducers use variable reluctance, magneto-resistance, and even optical detectors to measure the wheel rotations. The variable reluctance WSS often use a notched "tone-wheel" attached to the wheel rotor to generate a digital electrical output that can resemble a variable audio tone. If a wheel locks up, the digital pulses stop and an ABS controller 128 act to interrupt the hydraulic pressure to that wheel's brake calipers in a try to regain four-wheel tire traction with the road.

The ABS sensor information, and a great deal of other vehicle data in digital packet format are communicated by an industry-standard CANbus 130. Dead-reckoning computer 108 receives wheel turning tick information over CANbus 130 from nodes 132, 134, 136, and 138.

The controller-area network (CAN) is a vehicle bus standard that allows microcontrollers and devices to communicate with each other in a vehicle without a host computer or thousands of individual wires. The CAN Specification was published in 1991 by Robert Bosch GmbH (Stuttgart, Germany), see, www.can.bosch.com/docu/can2spec.pdf.

Data traffic is multiplexed onto a single two-wire bus, CANbus 130, and can include engine management, body control, transmission control, active suspension, passive restraint, climate control, and security information exchanges. CAN is now standard in OBD-II vehicle diagnostics, and has been mandatory in all vehicles and light trucks manufactured in the United States since 1996. The European on-board diagnostics (EOBD) Standard is similar, and is mandatory for all petrol vehicles sold in the European Union since 2001 and all diesel vehicles since 2004. Transmitters in a CAN network broadcast their messages to all the other nodes in the network. Each message has a unique type identifier so the nodes can discriminate if the message is relevant to them. These identifiers also include a message priority field so the CAN network can arbitrate priorities amongst colliding messages. A typical CAN implementation uses a two-wire bus and has a maximum data rate of one megabits per second. The CANbus data format has extensive error checking capabilities that are built into each data packet. The protocol automatically handles collisions of messages on the bus, so that higher priority messages are allowed to transfer before lower priority messages. Multiple controllers may be placed on the same bus, thereby reducing the amount of wiring and the number of connectors in vehicle 110. This also means that additional modules, like dead-reckoning computer 108, are rather easily added to an otherwise conventional vehicle network.

Whenever the CANbus 130 is idle, any unit may start to transmit a message. If two or more units start transmitting messages at the same time, the bus access conflict is resolved by bitwise arbitration using the IDENTIFIER. The arbitration mechanism guarantees that neither information nor time is lost. If a DATA FRAME and a REMOTE FRAME with the same IDENTIFIER are initiated at the same time, the DATA FRAME prevails over the REMOTE FRAME. During arbitration, every transmitter compares the level of the bit transmitted with the level that is monitored on the bus. If these levels are equal the unit may continue to send. When a "recessive" level is sent and a "dominant" level is monitored, the unit has lost the arbitration and must withdraw without sending anything more. The CANbus 130 comprises a single channel to carry bits from which the data resynchronization information are derived. The channel implementations are not dictated in the Specification, thus allowing single wire plus ground, two differential wires, optical fibers, etc.

Information from the non-steering left and right wheels wheel-tick sensors 124 and 126 is used to derive the basic delta-range and delta-heading of vehicle 110. Each rotation of the wheel will produce a fixed number of transducer pulses that are monitored by the anti-lock braking system (ABS) 128.

The arithmetic average of the number of left and right non-steering wheel turning ticks collected in a given period by the dead-reckoning computer 128 can produce an accurate delta-range measurement if the wheel circumferences or diameters are known with some precision. Distance information obtained from GPS receiver 104 over that same period are used for ongoing and continuous self-calibration.

The difference between the number of left and right non-steering wheel turning ticks is proportional to a delta-heading measurement, again if the wheel circumferences or diameters are known with precision. Any errors or changes in the circumferences or diameters of wheels 116 and 118 will, of course, produce corresponding errors in the delta-heading and delta-range estimates. The wheels and especially their tires can change in diameter significantly with speed, tire pressure, temperature, wear, loading, certain malfunctions, and after maintenance service operations.

Substantial stepped errors in the delta-heading and delta-range estimates can occur when vehicle 110 is moved while the dead-reckoning computer 108 or CANbus 130 is shut off, such as when vehicle 110 is rolled without running the engine. Such kinds of errors can be expected when the whole vehicle 110 is transported on a trailer or ferry.

Conventional systems have not managed nor controlled the errors in the delta-heading and delta-range estimates very well. Embodiments of the present invention are distinguished in these regards from the prior art by the following described technology.

Dead-reckoning computer 108 automatically integrates the delta-range and delta-heading measurements it receives from a starting location and heading into dead-reckoning navigation estimates expressed in a local level (North, East) coordinate packet. The initial delta-range and delta-heading conditions are obtained from position and velocity data routinely provided by GPS receiver 104.

FIG. 3 illustrates a combined GPS, and DR system 300 that can be implemented as in FIGS. 2A and 2B, for the application shown in FIG. 1. System 300 includes a GPS receiver 302 that produces GPS fixes 304 subject to outages and lapses when an antenna 306 cannot receive microwave signal transmissions from a number of orbiting GPS satellites 308. A dead-reckoning propagation processor 310 receives wheel ticks 312 from the wheels of a vehicle that are proportional in number to how many times the left and right side wheels each turn. A mode selector 314 selects whether to output GPS only, DR only, or a mix of GPS and DR navigation solutions in a composite 316. A road map disk and player 318 provide a road graphic for a user position display 320. Conventional practice is to visually "snap" the user position displayed to the nearest spot on a road, even though the GPS position solution didn't put it there.

A DR calibration 328 includes initial and on-going calibrations related to estimates of the wheel radii, and differences in individual wheel radii that occur over turns, speeds, and straight driving. The dead-reckoning propagation processor 310 uses these calibrations to compute range and heading from wheel-ticks 312 propagated from and calibrated by the occasional GPS fix 304.

After a long period of lapses in GPS fixes 304, GPS navigation receiver 302 would ordinarily have to engage in a wide search to reacquire GPS satellites 308. But here, DR range and heading propagation processor 310 will continue during the majority of GPS outages to compute position solutions. So these estimated time-and-position solutions are included in an instruction 330 for the GPS navigation receiver 302 to begin its initialization with a search around the present DR solution. The advantages of instruction 330 are that it can be used to generally speed up reacquisition, and also to make high sensitivity searches more practical in a fast moving vehicle application.

GPS receiver 302 is therefore configured to search around parallel and independent hypotheses using a large number of effective correlators (>44,000) it has available. Some of the effective correlators in GPS receiver 302 search around the dead-reckoning solution in a very tightly coupled way so that the reacquisition time is minimized if the dead-reckoning data was correct. It can simultaneously search around an alternative hypothesis if the dead-reckoning data turns out to be of lesser reliability. In the latter case, GPS receiver 302 is employed to help recover quickly after long outages of dead-reckoning-only mode 314, or after a long power off-period to offset, e.g., a long unmanaged track on a ferry boat.

For one-fix-per-second (1-Hz) dead-reckoning, 10-Hz wheel turning ticks observations are synchronized to the same one-second fix interval as the GPS fixes produced by GPS receiver 104 or 302. Such synchronization maintains a constant period between fixes when switching amongst dead-reckoning-only, GPS-only, and mixed-mode operation in selector 314. A wheel turning tick based delta-range and delta-heading is measured every one second GPS epoch. The absolute heading is obtained by integrating the delta-heading along with an initial heading reference, dead-reckoning-heading=heading-offset+sum(delta-heading).

Any change in the east and north direction can then be determined with,

Delta-East=delta-range*sin(dead-reckoning heading);

Delta-North=delta-range*cos(dead-reckoning heading).

Finally,

East position=initial east position+Sum(Delta-East);

North position=initial north position+Sum(delta-North).

The dead-reckoning measurements and calibration parameters are, delta-range=$B_L*C_L+B_R*C_R$ delta-heading=$A_L*C_L-A_R*C_R$ Heading=Heading-offset+sum delta-heading;

where, $C_L$, $C_R$: Counts of ticks accumulated in the CANbus packet for the left and right wheels respectively over a specified internal such as 1000 milliseconds. The wheel turning ticks are generated by differencing a current and its previous CANbus packet since the CANbus packet content is an accumulated number;

$B_L$, $B_R$: calibration parameters for delta-range/tick for left and right wheels (units of mm/tick);

$A_L$, $A_R$: calibration parameters for delta-heading/tick difference for left and right wheels (units of minutes/tick=degrees*60/tick); and Heading-offset: a calibration parameter that translates the sum delta-heading to a known heading reference.

Thus, a valid calibration requires an estimate of $B_L$, $B_R$ (remapped as simply "B" and dB), $A_L$, $A_R$ (or simply "A" and dA), and the heading-offset. GPS receiver 104 or 302 is used as the reference source for calibration data since it can provide accurate measurements of delta-range, delta-heading, and absolute heading, albeit only when its reception of satellite transmissions is not being interrupted.

The calibration parameters are initialized from known relationships of the physical attributes of vehicle 110, e.g., the physical parameters. These physical parameters are defined here as the left and right wheel radii ($R_l$, $R_r$), the track-width distance between the wheels (TW), and the number of counts or ticks generated per rotation (CPR).

In a turn of vehicle 110, the distance along the path of the turn is the product of the turning radius and changes in angle, e.g., the change heading in radians. The turn radius is related to the road size and is unknown, delta-range=turn radius*delta-Heading;

in meters and radians.

The wheel turning ticks generated are proportional to the distance traveled times the number of ticks per meter, Count=delta-range*CPR(ticks/rotation)/[2PI wheel radius];

in ticks and meters.

Thus, (Count/CPR)*2PI*wheel radius=turn radius*delta-Heading.

In a turn to the left, for example, the turning radius of the right wheel will be equal to the left wheel turning radius plus the track width. Thus, differencing the left and right delta-range equations causes the turning radius to cancel leaving, $C_L$/CPR*2*PI*$R_l$-$C_R$/CPR*2*$R_r$=TW*delta-Heading.

Re-arranging, the change in heading in degrees (delta-heading) is, delta-heading=$R_l$/CPR/TW*360*$C_L$-$R_r$/CPR/TW*360*$C_R$.

By inspection, $A_L$=$R_l$/CPR/TW*360 (degrees/tick);

$A_R$=$R_r$/CPR/TW*360 (degrees/tick).

The numerical precision can be improved by estimating the parameter in units of minutes, e.g., degrees*60. So $A_L$ and $A_R$ compute as, $A_L$=$R_l$/CPR/TW*360*60 (minutes/tick);

$A_R$=$R_r$/CPR/TW*360*60 (minutes/tick).

Where the difference in the left and right wheel turning ticks represents a heading change, and the average of the left and right wheel turning ticks represents a delta-range of the center of vehicle 110, delta-range=$R_l$/CPR*PI*$C_L$+$R_r$/CPR*PI*$C_R$.

By inspection, $B_L$=$R_l$/CPR*PI (meters/tick);

$B_R$=$R_r$/CPR*PI (meters/tick).

Estimating this coefficient in millimeters improves the numerical precision. So $B_L$ and $B_R$ compute as, $B_L$=$R_l$/CPR*PI*1000 (millimeters/tick);

$B_R$=$R_r$/CPR*PI*1000 (millimeters/tick).

Table-II show the physical parameters and their corresponding calibration parameters for a typical vehicle 110 with 17" wheel radius, 84" track-width, and 200 ticks per wheel revolution. The example case in Table-I represents a realistic situation in which one wheel (the left) is slightly larger than the other wheel (the right). The calibration parameters are in the units.

TABLE II

| Physical Parameters | | | |
|---|---|---|---|
| $R_l$(m) | $R_r$(m) | TW(m) | CPR(ticks) |
| 0.4445 | 0.4441 | 2.1336 | 200 |
| Calibration Parameters | | | |
| $A_L$(min/tick) | $A_R$(min/tick) | $B_L$(min/tick) | $B_R$(min/tick) |
| 22.5000 | 22.4798 | 6.9822 | 6.9759 |

After the calibration and physical parameters are obtained, an additional parameter, referred to herein as the "heading-offset" is required to actually begin dead-reckoning. The heading-offset parameter can only determined in real-time when enough motion of GPS antenna 106 causes data to be generated that can be used for calibrations.

The GPS-heading is computed every second from a GPS velocity vector as a tan(East speed/North velocity), and is zero for due north and 180-degrees for due south. A delta-heading from dead-reckoning is measured every second from the difference in wheel turning ticks scaled by parameters $A_L$ and $A_R$. A dead-reckoning-delta-heading-sum is the sum of all dead-reckoning delta-headings. The profile of this parameter matches the changes in true heading, but will diverge from the true heading by an integration constant. Dead-reckoning-heading is the sum of dead-reckoning-delta-heading-sum and a final parameter referred to as the heading-offset.

The heading-offset is an arbitrary difference between the GPS heading and the dead-reckoning-delta-heading-sum. The heading-offset could be expected to be a fixed value, but in practice it drifts around, depending upon the stability and accuracy/availability of the CANbus data and the calibration accuracy. Any lost CANbus packets during a fixing session, or between fix sessions, can cause an un-predictable error in the heading-offset. The idiosyncrasies of individual manufacturer's wheel-tick sensors can also affect the stability of the heading-offset.

Anytime the GPS speed is above zero, GPS receiver 104 or 302 will continue to update an estimate of the heading-offset. In this way, the system 100 can quickly recover from any unusual wheel-tick conditions.

Both the heading-offset and the sum of all dead-reckoning delta-headings must be retained in a non-volatile memory as a pair so dead-reckoning can be available immediately after turn on. E.g., in a "garage mode", the data pairs are fetched at the start of a GPS-dead-reckoning session. See FIG. 4. This implies the data pairs must be saved properly at the end of every session using a Persistent Stop Command.

A "Garage Start" is a starting mode where dead-reckoning is immediate after starting GPS receiver 104 or 302, and a previous calibration had been computed and is now retrieved, e.g. from non-volatile memory. Garage Start is useful when vehicle 110 starts up in a garage and the GPS reception is not good.

Garage Start requires that a special GPS off-command had to be executed in the previous shutdown. This off-command is referred to herein as the "Persistent Shutdown" command. When received, a bit is stored in non-volatile memory with various calibration parameters that indicates a Garage Start is to be executed on a next GPS-On event. It must be reasonable to assume that the GPS receiver 104 or 302 has not been moved between sessions. If such precondition is met, the new session can be regarded as being accurate from its beginning because the previous position and heading provided a valid starting condition for the new session.

The accuracy and correctness of the heading-offset and the sum of all dead-reckoning delta-headings data depends on the attending to all the CANbus data generated when vehicle 110 is moving. So GPS receiver 104 or 302 should only be turned off after vehicle 110 is parked and will not move. GPS receiver 104 or 302 should be allowed to get up and running before vehicle 110 moves again so the GPS doesn't miss receiving and buffering important CANbus data on CANbus 130.

The CANbus data must be time-stamped in real time so that short outages or gaps are recognized and can be corrected. Data must not be collected and pushed into GPS receiver 104 or 302 asynchronously without properly time-stamping the data. A tight sharing of GPS system and CANbus time domains is not required in embodiments of the present invention. The time-stamps on the CANbus data collected are interpolated and averaged to reduce time stamp noise, and also to reduce the effects of any time drift between the GPS and CANbus clocks.

Some dead-reckoning embodiments can only accept 10-Hz wheel turning ticks, so the time-stamp error should be less than fifty milliseconds. The recommended variation in the time-stamp should have a standard-deviation less than 10-msec.

The quick availability of the GPS heading is a critical factor in how quickly and accurately the system 100 can calibrate and re-cover from CAN outages, wheel slip, or other unusual events. Having the heading available first is required for computing all the other calibration parameters.

The basic worst case heading error model (in degrees) is computed as the arctan(speed Error/speed). Heading cannot be determined by GPS receiver 104 or 302 if vehicle 110 is not moving, since the ratio will tend to wrap around arbitrarily. However, it is possible to determine the heading at slow speeds, depending on the accuracy of the speed estimates and depending on the magnitude of any speed error. The speed error is modeled as the GPS carrier Doppler measurement noise times the horizontal dilution of precision (HDOP).

The Doppler measurement noise is mainly dependent on the signal strength, or signal-to-noise ratio (SNR). Any interference caused by reflected signals in the "urban canyon" will increase the true measurement error and result in speed and heading errors. GPS receiver 104 or 302 constantly works to eliminate such error from its measurements.

In a conservative heading error model for four different signal conditions:
  a favorable model at 44 dB-Hz,
  an unfavorable model at 34 dB-Hz,
  a metalized cabin and window model at 28 dB-Hz, and
  another out of spec model at 24 dB-Hz;
  the estimated speed errors, assuming an HDOP=6, are 0.02, 0.2, 1.2 and 2 km/hr, respectively.
A simple summary of which is,
Heading error<1 degree at 44 dBhz at 2 km/hr;
Heading error<1 degree at 34 dBhz at 12 km/hr;
Heading error<3 degree at 28 dBhz at 23 km/hr;
Heading error<3 degree at 24 dBhz at 40 km/hr.

An algorithm embodiment of the present invention uses these models and observes the stability of the heading itself to determine which headings can be included in the calibration parameters.

The heading-offset should be determined within five seconds, as long as the speed is above 20 km/hr for the least unfavorable conditions. For a metalized cabin characterized by a 28 dB-Hz average SNR, the parameters will still calibrate at the lower speed, but the accuracy will be degraded. However, continuous filtering can be used to reduce the heading error.

Figure 6:
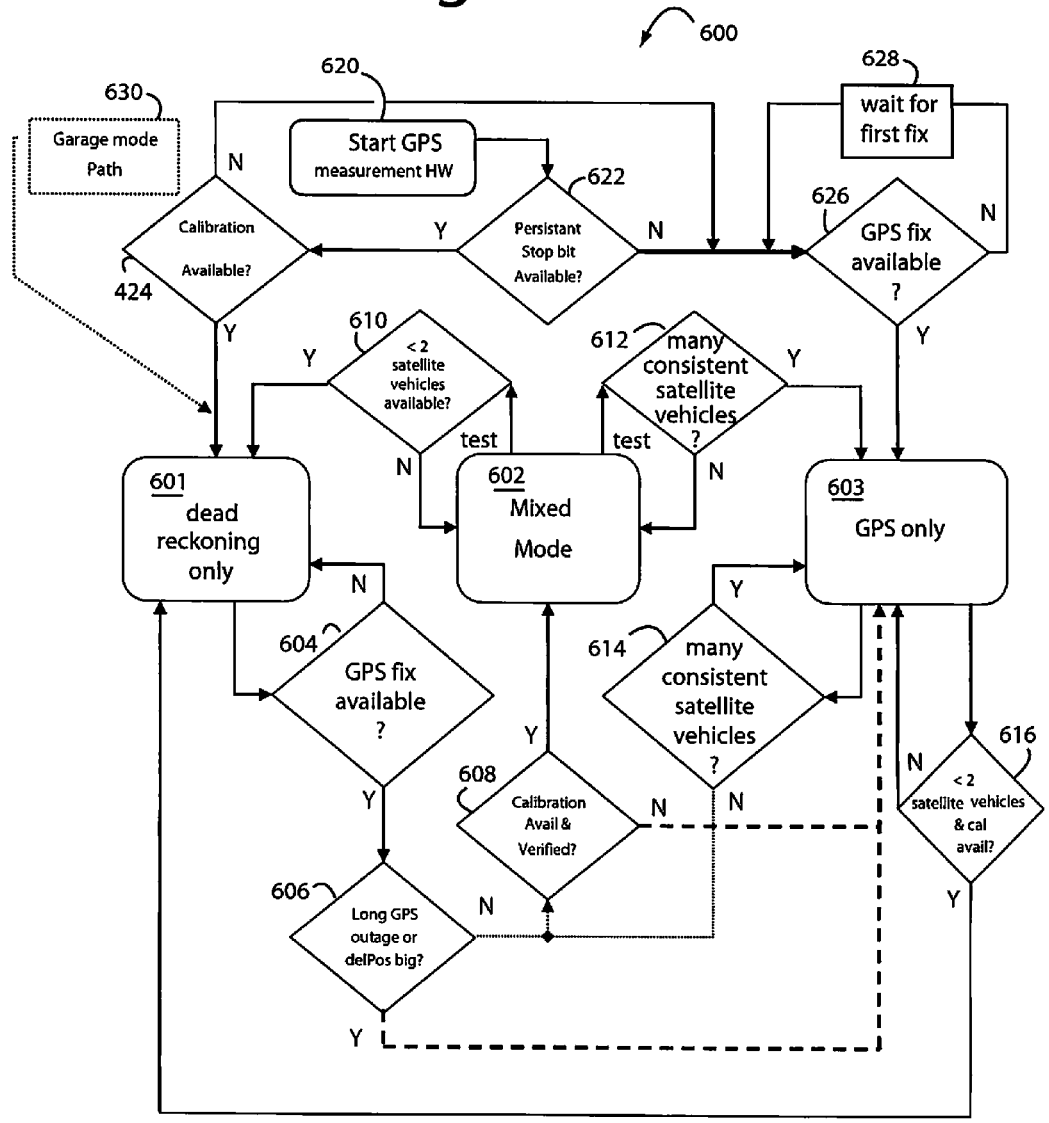
FIG. 6 is a flowchart diagram of a fix mode state machine that controls the interrelationships amongst a dead-reckoning-only mode, a mixed-mode, and a GPS-only mode.

A stop command called "Persistent Stop" is defined here, and mentioned in FIG. 6. It is used as a flag to stop GPS receiver 104 or 302 and to preserve heading calibrations from one fix session to the next, bridging over power down periods. Persistent Stop is needed to guard against chaotic shutdowns. In conventional implementations, a normal stop command is issued and vehicle 110 can move again before getting the next start command. As a consequence, the last position and heading were no longer valid. So, here a heading offset is declared invalidated for a general stop command. The Persistent Shutdown should be invoked to indicate that vehicle 110 has stopped and will not move again until after a next "start" command is received.

Some conventional code libraries required that CANbus data could not be sent to GPS receiver 104 or 302 prior to initializing the GPS core with the previous run information. Any CANbus data received before reading calibration from memory declared such CANbus data to be uncalibrated. CANbus data is ignored until the previous run data is read. Here, there is no restriction on the timing of the CANbus data and the reception of the previous run file. That is, the data will processed as soon as the calibration is received and the heading offset will be maintained if it was previously available.

FIG. 4 represents the relationships between the CANbus data flow and timing of a GPS receiver start and Persistent Stop. There are three phases of operation, 401-203. In phase 401, GPS receiver 104 or 302 is OFF, but CANbus data from CANbus 130 is present. The data can be presented to GPS receiver 104 or 302 in the normal manner, even though it has not yet started. A step 410 receives a turn-on engine command, meaning navigation will be needed. A step 412 starts a host CPU (see FIG. 7) and begins receiving CANbus data. A step 414 provides the GPS application running in the host CPU with pointers in the nonvolatile (NV) memory to the previous run information. A step 416 loads the initial factory production parameters that are generic to the vehicle model and configuration. A step 418 starts the GPS application and hardware with a START command and reads in the non-volatile memory. A step 420 represents reading and writing of the non-volatile memory.

Previous run data is not saved during dead-reckoning in phase 401 of the CAN flow chart. A sector erase will eventually be required when the available storage area is consumed. But such an erase makes it difficult for the dead-reckoning system to keep up with incoming CANbus data because the sector erase hogs the system instruction bus while the erase is being performed. The previous run storage during a session is meaningless since the only valid storage time would be when vehicle 110 was stopped and will not move again until a next fix session. Otherwise, the accuracy of a next garage session would be impossible to maintain.

In phase 402, GPS receiver 104 or 302 has been started and dead-reckoning is available in a step 422. Phase 402 ends when a step 424 receives a turn-off engine command.

In phase 403, GPS receiver 104 or 302 is stopped with a Persistent Shutdown command in a step 426. A step 428 represents updating of the non-volatile memory with DR propagation data. CANbus data may still reach GPS receiver 104 or 302, but it will be ignored.

Figure 5:
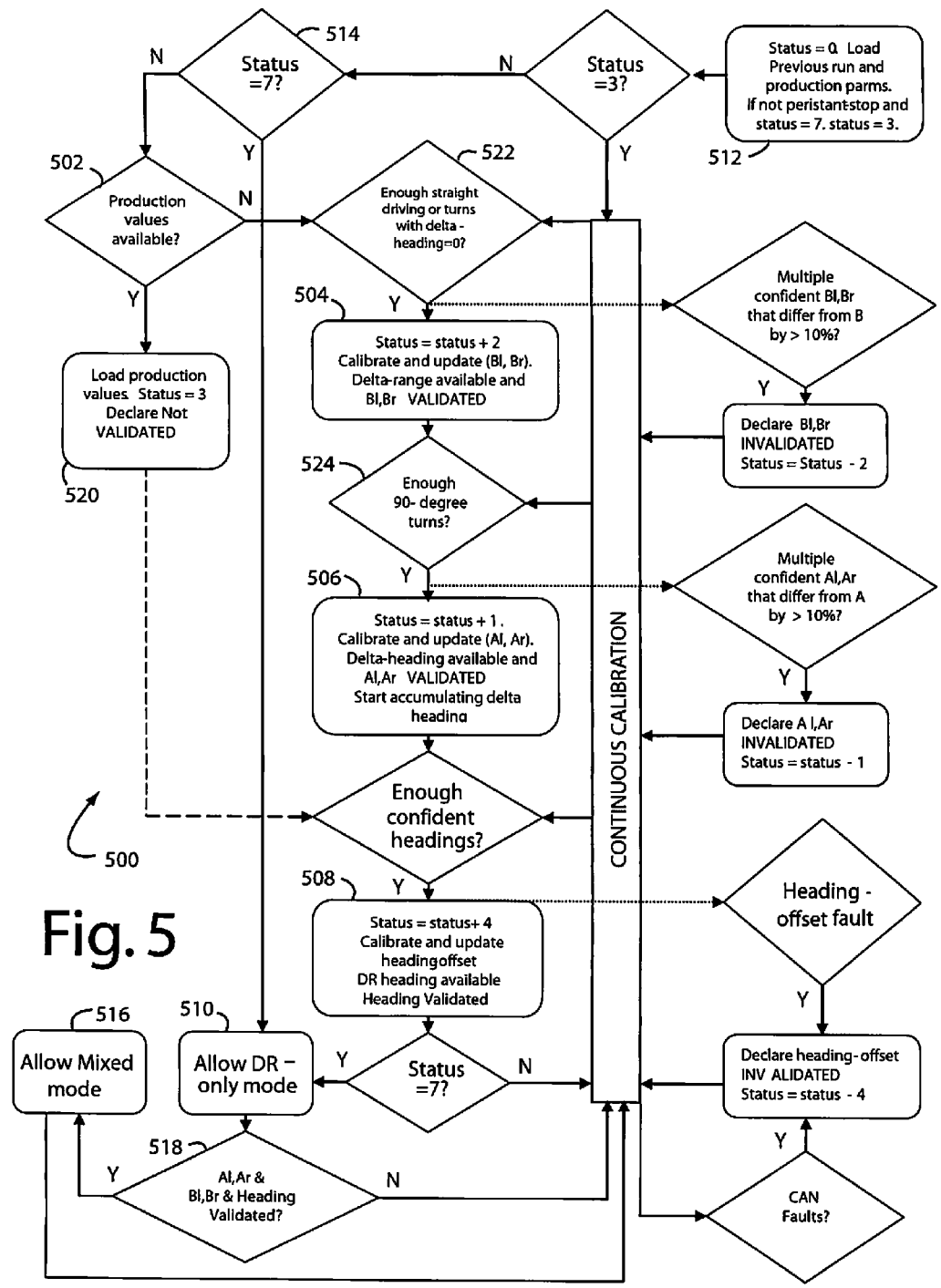
FIG. 5 is a flowchart diagram showing the transitions between various calibration states for tightly coupled GPS and dead-reckoning system like those of FIGS. 1, 2A, and 2B.

FIG. 5 represents an on-going calibration process 500 that continually mixes various sources of calibration data with the real-time calibration provided by GPS receiver 104 or 302. This makes for tight-coupling of the GPS and the dead-reckoning. Each real-time calibration contribution increases the confidence level of an overall calibration status that has levels Status-1, Status-3, Status-4, and Status-7. For example, calibrating parameter-B adds 2, parameter-A adds 1, and a heading-offset adds 4. The highest confidence level, Status-7, is the desired state and the only one in which dead-reckoning results are available for the user.

There are no contests between factory parameters and partial calibrations. Factory calibrations enter the previous run data when the previous run data is empty or has been cleared. So, a calibration Status-7 will not be lost as live calibrations begin to overtake the initial estimates that were based on initial production values. Partial calibrations prior to a first complete calibration will also not be lost as production data mixes with the real-time data. This process continues until all the production estimates have been over-written with real-time data.

In a step 502 when there are no previous run or factory parameters, the dead-reckoning status parameter progresses from "0" the initial state where no parameters have been calibrated. In a step 504 the status increases to "2" where the delta-range "B" calibration parameters have been calibrated, and the left and right wheel radius and ratio have been determined. In a step 506, the dead-reckoning status parameter increases to "3" when the delta-heading and delta-range "A" calibration parameters, and the physical parameter track width (TW) have been calibrated. The delta-range must be calibrated before calibrating delta-heading.

In a step 508, the dead-reckoning status parameter increases to "7" when the heading offset, delta-heading and delta-range are calibrated. Dead-reckoning and mixed mode are then available in a step 510, since the wheel radii, ratio, and track width have been validated from GPS data.

In a step 512, if a calibration is available from a previous session and is retrieved from non-volatile memory, then the dead-reckoning and calibration continue from that starting point. In a step 514, dead-reckoning is immediately available in step 510 if Status-7 was reached previously and the previous session was terminated with the Persistent Stop command. Mixed mode is available in a step 516 if the calibration parameters were validated with GPS data in a step 518.

Figure 7:
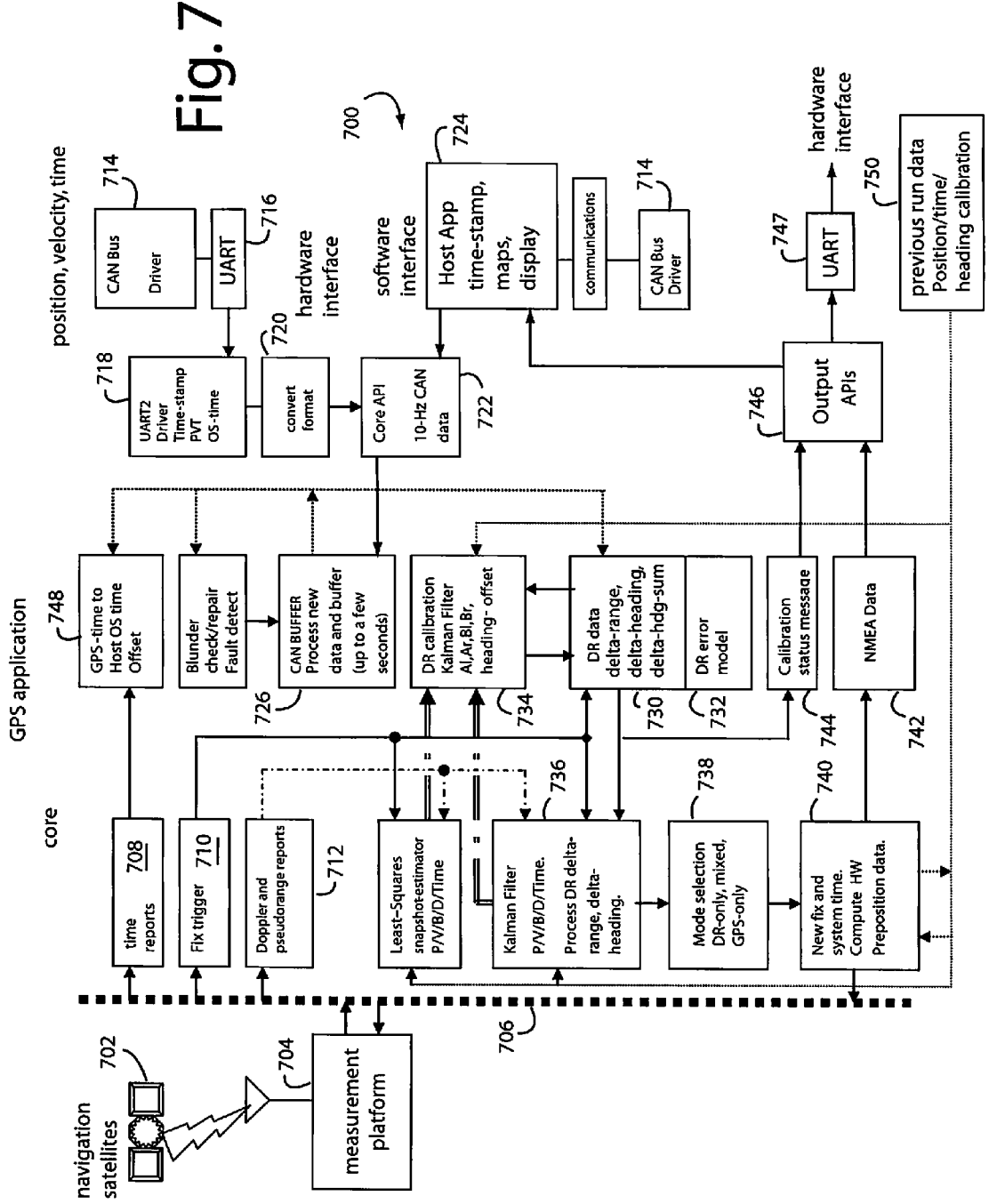
FIG. 7 is a functional block diagram of a tightly coupled GPS and dead-reckoning system for a vehicle like that of FIG. 1.

An alternative calibration method depends on a host applications program interface (API), see FIG. 7, e.g., the Factory Parameters mode, or production mode. Most users prefer to have dead-reckoning available as soon as possible. In a step 520, such Factory Parameters mode provides close, initial physical parameters for wheel radius, track width and CPR when the previous run data is empty or absent. These physical parameters are converted to the A and B calibration parameters and thereby produce calibration status-3. Only a brief observation of GPS heading above three meters per second is needed to raise the calibration to status-7, and then dead-reckoning is made available.

It is unrealistic to expect the highest dead-reckoning accuracy, Status-7, with the API Factory Parameters mode, because the wheel ratio and track width cannot be measured accurately enough at the factory for individual vehicles 110. The ratio of the wheel radius and track width must be known to better than 1% error. Empirical measurements provided by the GPS receiver 104 or 302 are the practical answer to getting good enough measurements. For this reason, mixed-mode operation has to be postponed until a full set of calibration parameters have been determined precisely using GPS calibration data.

The typical sequence starting in production mode in step 520 begins with Status-3, as an initial state. It assumes the left and right wheel radius and track width are calibrated. Production mode cannot specify different radii for each wheel. So, mixed mode is not available until the calibrations are verified. Status-7 results when the heading offset is calibrated. Dead-reckoning becomes available, and mixed mode too is available only after the calibration has been verified in step 518. Verification requires the same conditions as a cold start calibration.

There are a few minimum vehicle driving requirements needed to exercise GPS receiver 104 or 302 enough to provide calibrating information for parameter-A, parameter-B, and the heading-offset. These are summarized in Table-III. These are also reflected in a step 522 and 524 in FIG. 5.

TABLE III

Minimum vehicle driving requirements for calibration

| Parameter | Minimum requirements |
|---|---|
| B | three straight segments of at least fifty meters (50-m with CRP-50, 100-m for CPR = 100) |
| A | Five right angle turns with least unfavorable conditions (at least four navigation satellites with power greater than 54 dB-Hz) |
| Heading offset | Minimal speed is 6 m/s = 21.6 km/hr with at least unfavorable conditions for at least five seconds. |

Continuous calibration best spans the life of vehicle 110. Raw data is pre-filtered and verified before being processed in the main Kalman Filter estimators of each calibration parameter. Generally, good calibration can be maintained permanently as long as the previous run data is maintained, e.g., in non-volatile memory. If the previous run data was completely lost, the original production values can be used as the starting point so that dead-reckoning can be made available as soon as possible.

There are certain conditions that will cause the calibration status to lower to below state-7. Firstly, there can be faults in the wheel turning tick (CANbus data), as summarized in Table-IV.

TABLE IV

Types of CAN faults that lower calibration status

| CAN Fault type | Description |
|---|---|
| CAN integrity fault | Data does set "Data Integrity" in CAN message |
| CAN direction fault | Data does not indicate either Forward or Reverse |
| dead-reckoning-off command | dead-reckoning is disabled by user sending command to GPS receiver to turn off dead-reckoning |
| CAN outage | GPS detects faults in CANbus data outage of data longer than 5 seconds (GAP longer than gap-fill algorithm allows) |
| CANbus data instability | Instantaneous jumps in CANbus data that are beyond the range of correction by GPS algorithm. Note: many wheel slip or sensors are smoothed by pre-filtering |

These kind of CAN faults basically lower the calibration status to state-3. So, A and B calibration are not lost. Dead-reckoning and mixed mode are available as soon as the fault is corrected and after a new heading calibration is achieved.

It is also possible that the calibration status gets lowered due to calibration faults. The algorithms should be constructed to minimize these occurrences to the point they become very rare. Advanced pre-filter logic is implemented to not allow the condition to occur on chaotic or noise calibration measurements. The most likely event that would cause a calibration fault is an incorrect factory calibration, see Table-V.

TABLE V

Types of calibration faults that lower calibration status

| | |
|---|---|
| A, B calibration parameter errors | Persistent (repeatable) and precise (similar) calibration measurements that differ from production or measured calibration data by more than 10% The dead-reckoning status changes by removing the value of the parameter in question: B removes value 2 A removes value 3 Heading offset is always removed (removes the value 4) Recovery requires the same conditions as cold calibration to recover the states that were lost |
| Heading offset error | Instantaneous changes in dead-reckoning heading-offset larger than 90 degrees and GPS has been consistently available. (Means that a heading fault will not be declared after a long GPS outage since a large heading-offset change is possible in this case.) Lowers the heading calibration state Recovers as soon as heading-offset are re-measured |
| No Persistent stop bit detected | Means that receiver was not shut down properly. Means Garage mode is not available. Removes value 4 from dead-reckoning status. Dead-reckoning (and mixed mode) available as soon as GPS is available to re-calibrate the heading-offset. |

FIG. 6 shows a fix mode state machine 600 and the inter-relationships amongst a dead-reckoning-only mode 601, a mixed-mode 602, and a GPS-only mode 603, depending on the availability of GPS assets and wheel data calibrations. The fix mode state machine 600 could be used to implement mode selector 314 in FIG. 3.

In dead-reckoning only mode 601, a test 604 sees if a GPS fix is available from GPS receiver 104 or 302. If yes, a test 606 asks if there has been an excessively long outage of GPS or the change in position (delta-position) is large. If yes, then operation switches to GPS only mode 603.

But if not, a test 608 asks if a calibration of the dead-reckoning parameters is available and verified. If yes, then mixed mode 602 is allowed. Otherwise, operation has to switch to GPS only mode 603. While in mixed mode 602, two tests are run constantly. A test 610 sees if less that two satellite vehicles are available. If true, the GPS solution quality is not good enough and operation has to switch to dead-reckoning only mode 601. This can occur when vehicle 110 enters a tunnel.

The other constantly running test in mixed mode 602 is a test 612 that looks to see if there are many consistent satellite vehicles. If so, the GPS results are very strong and it is better to switch to GPS only mode 603. While in GPS only mode 603, a test 614 looks to see if there are many consistent satellite vehicles. If so, the GPS results are very strong and operation can continue in GPS only mode 603. A test 616 asks if less that two satellite vehicles are available, and if calibration is available. If so, operation switches to dead-reckoning only mode 601.

When the hardware for tightly coupled GPS and dead-reckoning system 100 first starts up, the fix mode state machine 600 begins in a step 620. A test 622 looks to see if a Persistent Stop bit has been set, e.g., in non-volatile memory. If so, a step 624 sees if calibration data is available. If yes, the operation begins in dead-reckoning only mode 601 and the GPS receiver 104 or 302 can come up in background without delaying vehicle navigation solutions being display to the user. But if not, a step 626 asks if a GPS fix is available. If not, a loop 628 waits. When a GPS fix becomes available, then operation switches to GPS only mode 603.

In outdoor conditions, a 1-second hot-start time-to-first-fix (TTFF) is possible with GPS if the previous data comprising the ephemeris, position, and time are available and still fresh. However, in the automotive application of vehicle 110, the GPS signals may be shadowed by the vehicle being in a garage, or otherwise cannot start from a GPS hot condition. So startup would need to begin with a garage mode step 630.

Even if vehicle 110 is in open skies, a "garage" start will occur if the ephemeris data is deemed to be too old. But, as long as good dead-reckoning data is available, e.g., full calibration status-7 and the persistent stop bit is available, then the dead-reckoning only mode 601 can commence within one second. Garage mode 630 is best included in systems that do not have a battery backed 32-kHz real-time clock (RTC) that helps keep track of GPS time to better than one millisecond.

If a full calibration or the persistent stop bit is not available, then the garage mode 630 is not available for that session, and a first fix can be only be produced after a new GPS fix is computed.

In garage mode, dead-reckoning always starts from the previous location. However, the correctness of that decision cannot be determined until the first GPS fix is available.

As soon as the first GPS fix is available, a decision must be made as to whether to trust the current dead-reckoning position since it is possible that vehicle 110 was moved while GPS receiver 104 or 302 was off. For example, when vehicle 110 is placed on a ferry-boat and transported. A test of the delta-position from the new GPS fix and the latest dead-reckoning is made. If the distance is large, then the GPS-only fix is selected to reach a correct position solution as fast as possible.

If the distance vehicle 110 was moved is not large, then the fix will be either GPS-only mode 603 or mixed mode 602, depending on the relative accuracy of the GPS measurements and propagated dead-reckoning fix. Very confident GPS measurements, or lower accuracy dead-reckoning, will push the state machine 600 to GPS-only mode 603, whereas lower confidence GPS data will push more to the mixed mode 602.

In order to use mixed mode 602, the calibration must have been already validated. This is always the case when factory parameters are used. This means there will be a short period in the operational life where mixed mode 602 is not obtainable, e.g., before getting enough driving in with calibration capability is observed.

In the general case after the calibration has been validated, the fix mode is dead-reckoning-only 601 if less than two navigation satellites are available. If the number of navigation satellites is higher, and the estimated multipath is low with respect to the estimated dead-reckoning calibration accuracy, then the fixes will be GPS-only mode 603. If the number of navigation satellites is not high, or the estimated multipath is high with respect to the estimated dead-reckoning calibration accuracy, then the fixes will be mixed-mode 602.

The determining of the fix mode 601-603 is made continuously, the selected mode 601-603 can change every second. The GPS and dead-reckoning conditions are constantly evaluated to determine if a transition to mixed mode or GPS-only will provide better results. For example, if the last mode was GPS-only 603, then an increased multipath environment or a reduction of navigation satellites will be reason enough to transition to mixed-mode 602.

Similarly, if the current mode is mixed-mode 602, the conditions will be constantly evaluated to determine if a transition to GPS-only 603 would provide better results. If the current mode is dead-reckoning-only 601 and more than two satellites become available, then a transition to either GPS-only 603 or mixed mode 602 will occur. For short outages where the integration of the dead-reckoning error is small, the transition will be to mixed mode 602. However, for longer outages, it is more likely that a GPS-only mode 603 will be selected briefly in order to quickly snap to an unbiased position estimate. However, only a few fixes in GPS-only mode 603 are needed to resume the best accuracy. In general, the fix mode will return to mixed-mode 602 unless the number of navigation satellites is high and the estimated multipath error is small in comparison to the estimated calibration accuracy.

The update rate of information can be as fast as 1-Hz and provides the "ultra coupled" characteristic that is used to describe integrated GPS and inertial navigation systems. Dead-reckoning and GPS information are combined inside the main position/velocity Kalman Filter. The dead-reckoning measurements of delta-range and delta-heading are combined directly with GPS Doppler and pseudorange measurements.

Such provides the "tightly" coupled approach characteristic of the combined GPS and inertial navigation system 100, and that performs better than a "loosely" coupled solution where the GPS and dead-reckoning position and velocity estimates are computed independently and are then blended together in the position/velocity domain without sharing information to help each other.

Continuous calibration carries on when in mixed-mode with a parallel calibration methodology. An independent speed and heading estimator is used for a reference for the continuous calibration of the CAN calibration parameters, independent of whether the position is computed with GPS-only or mixed mode.

The three position modes 601-603 are used instead of only two. The basic DR input data has a 1-tick quantization, e.g., 5.6-cm for a 17-inch wheel with 48 ticks. Some sensors will skip outputting ticks at slow speeds. Outages, wheel slip, and missed CANbus packets can occur. Blunder checking and filtering can be applied to correct most errors prior to usage, but cannot be used for calibration.

Wheel turning tick time synchronization can vary depending on CANbus 130 and Host CPU loading. The wheel-ticks difference is biased for banked roads. Tires can change in size over temperature, speed, age. Dead-reckoning sensing and processing is different for each manufacturer, and therefore have different error characteristics. The accuracy of dead-reckoning is also strongly dependent on the quality of the calibration. Even a one degree heading calibration error can integrate to a huge position error given enough distance traveled. Dead-reckoning based positions are essentially the integrals of derivatives, delta-heading and delta-range. Thus, the integral will have an unknown integration constant or error from the true delta position. So, the integration of dead-reckoning wheel turning ticks is always biased and dead-reckoning cannot provide absolute positioning capability.

GPS sensors have quite a different set of characteristic advantages and disadvantages. GPS carrier phase observations can be measured to better than 5% of carrier wavelength (0.05*0.19 m<one centimeter). They average the Doppler over fifty phase measurements in one second from a 50-Hz phase-lock-loop to reduce carrier phase standard deviation to 1-mm/sec. The integration of the GPS carrier frequencies is much more accurate than trying to integrate wheel turning ticks. GPS pseudorandom codephase provides for absolute positions. The codephase wavelength is 293-m but can be measured to one meter accuracy if there is no multipath interference. The vulnerability in urban areas is that GPS suffers from multipath and pure reflections.

Given the advantages and disadvantages of dead-reckoning sensors and GPS sensors, GPS-only mode 603 is used to recover the fastest from outages in GPS signal reception that forced long periods of operation in dead-reckoning-only mode 601. Dead-reckoning mode 601 cannot measure absolute error, it can only measure changes in position. Thus, any mixing in of dead-reckoning data would only slow down a recovery from a GPS outage. GPS-only mode 603 is used to determine the best absolute accuracy when GPS conditions are favorable without mixing in integration biases from dead-reckoning and CANbus data faults such as wheel slip and quantization errors.

GPS-only mode 603 is used to provide a more robust solution across multiple dead-reckoning systems. Each manufacturer's CAN bus implementation is slightly different, and varies amongst the different types of vehicles sold in the world. Maximizing GPS-only mode 603 use hides the differences because mixed mode 602 is only used when the GPS error is larger than the dead-reckoning error.

Mixed mode 602 is used to stabilize the GPS-based position solution in the presence of high multipath or high horizontal dilution of precision (HDOP) due to few usable navigation satellites. Mixed mode 602 is used to maintain high GPS accuracy when entering a dense urban canyon.

A relative weighting of mixed mode 602 to GPS-only mode 603 balances between the absolute accuracy of GPS solutions relative to the accuracy of dead-reckoning. This advantage can change in as little as one second.

In general, in open sky conditions, the best navigation performance is with GPS only mode 603, the GPS carrier phase measurements are more accurate than wheel sensors. In urban conditions, the best navigation performance is with mixed-mode 602, because effects of multipath and reflection noise exceed the effects of the dead-reckoning noise.

GPS chipsets and modules without on-board processors are categorized as measurement platforms (MP) and provide data to a host processor through a serial UART connection. The host CPU executes navigation software that computes the location and heading information. Such navigation software is host operating system independent for compatibility with a wide variety of host platforms including ARM, Strong ARM, Pentium, SH-Mobile, Samsung and other commonly available micro-Processors. Modules and chipsets with on-board processors are categorized as position, velocity and time (PVT) solutions and provide full navigation capabilities in standard NMEA or proprietary format. The navigation software is embedded on the module or chipset.

FIG. 7 represents an ultra-tightly coupled dead-reckoning subsystem embodiment of the present invention, and is referred to herein by the general reference numeral 700. FIG. 7 further illustrates feasible implementation details for some of the items shown in FIGS. 1, 2A, 2B, and 3. FIGS. 2A and 2B made distinctions about implementing the functional constituent parts in hardware or software, here in FIG. 7 the functional interrelationships are represented.

Orbiting navigation satellites 702 transmit microwave signals that are received and demodulated by a navigation measurement platform (MP) 704, e.g., an eRide (San Francisco, Calif.) OPUS-III nanoRide GPS module with a serial output. MP 704 includes a 32-channel radio frequency (RF) receiver, baseband, and SAW-filtering stages. The MP 704 is capable of two-channel real-time differential GPS with satellite based augmentation system (SBAS). These connect through a hardware interface 706 and provide time reports 708, fix triggers 710, and Doppler and pseudorange reports 712.

For the PVT type of implementation illustrated in FIG. 2B, CANbus 130 data is brought in by a CANbus driver 714 and UART 716 for time stamping in device 718 and format conversion in device 720. An applications programming interface (API) 722 inputs the CANbus data. Alternatively, for the MP type of implementation illustrated in FIG. 2A, CANbus information with appropriate time stamps is provided by a host application 724.

A CAN buffer 726 processes new wheel-tick data and buffers up to a few seconds worth. Herein, $C_L$, $C_R$ are the counts of ticks accumulated in the CANbus packet for the left and right wheels respectively over 100-milliseconds. The wheel-tick counts are generated by differencing the current and previous CANbus packet, since the CANbus packet contents is an accumulated number. This data is used by dead-reckoning (DR) propagation processor 730 to produce delta-range, delta-heading, and delta-heading sum estimates. DR propagation processor 730 shapes a DR error model 732.

A DR calibration device 734, includes a Kalman filter for $A_L$, $A_R$, $B_L$, and $B_R$. The $A_L$, $A_R$ calibration parameters represent delta-heading/tick difference for left and right wheels, e.g., units of minutes/tick=degrees*60/tick. $B_L$, $B_R$ are calibration parameters for delta-range/tick for left and right wheels, e.g., units of millimeters/tick. The heading-offset is a calibration parameter that translates the sum delta-heading to a known heading reference.

A Kalman filter 736 processes delta-range and delta-heading, and mixed mode propagation from position, velocity, parameter-B, delta range and heading D, and time. A mode selection process 738 is detailed in FIG. 6 as process 600 and is represented as selector 314 in FIG. 3.

A data process 742 provides position solutions encoded in NMEA navigation messages. A calibration status message 744 and the NMEA message are connected through to an output API 746. In the PVT 250 type of implementation of FIG. 5B, the NMEA navigation messages and calibration status message are output through a UART 747. Otherwise, for the MP 200 type of implementation of FIG. 5A, the NMEA navigation messages and calibration status message are output to the host computer application 724 through a software interface.

A valid time offset calculation is provided in an offset calculation process 748 between the CANbus data time and GPS receiver internal timer is also required for proper dead-reckoning mode. This requires a millisecond accurate time-stamp received with the CANbus packet data as well as a call-back function to the read the CAN timer. However, offset calibration is automatic and progresses from reception of the first CAN data packet received. This required calibration step does not prevent entering dead-reckoning mode on the first CANbus data packet after a valid calibration.

GPS receiver 104 or 302, and 700 communication is defined within the NMEA specification. Most computer programs that provide real time position information understand and expect their data to be in NMEA format. This data includes the complete position, velocity, time (PVT) solution computed by GPS receiver. NMEA sends a line of data called a sentence that is totally self-contained and independent of other sentences. There are standard sentences for each device category and there is also the ability to define proprietary sentences for use by the individual company. All of the standard sentences have a two letter prefix that defines the device that uses that sentence type. For GPS receivers the prefix is GP. The prefix is followed by a three letter sequence that defines the sentence contents. NMEA allows hardware manufactures to define their own proprietary sentences that begin with the letter P and are followed by three letters that identifies the manufacturer. For example a Garmin sentence would start with PGRM and Magellan would begin with PMGN.

Each sentence begins with a '$' and ends with a carriage return/line feed sequence and can be no longer than eighty characters of visible text (plus the line terminators). The data is contained within this single line with data items separated by commas. The data itself is just ASCII text and may extend over multiple sentences in certain specialized instances but is normally fully contained in one variable length sentence. The data may vary in the amount of precision contained in the message. For example time might be indicated to decimal parts of a second or location may be show with 3 or even 4 digits after the decimal point. Programs that read the data should only use the commas to determine the field boundaries and not depend on column positions. There is a provision for a checksum at the end of each sentence which may or may not be checked by the unit that reads the data. The checksum field consists of a '*' and two hex digits representing an 8 bit exclusive OR of all characters between, but not including, the '$' and '*'. A checksum is required for some sentences.

There have been several changes to the standard but for GPS use the only ones that are likely to be encountered are 1.5 and 2.0 through 2.3. These just specify some different sentence configurations which may be peculiar to the needs of a particular device thus the GPS may need to be changed to match the devices being interfaced to. Some GPS's provide the ability configure a custom set the sentences while other may offer a set of fixed choices. Many GPS receivers simply output a fixed set of sentences that cannot be changed by the user. The current version of the standard is 3.01. I have no specific information on this version, but I am not aware of any GPS products that require conformance to this version.

NMEA consists of sentences, the first word of which, called a data type, defines the interpretation of the rest of the sentence. Each data type would have its own unique interpretation and is defined in the NMEA standard. The $GPGGA sentence provides essential fix data. Other sentences may repeat some of the same information but will also supply new data. Whatever device or program that reads the data can watch for the data sentence that it is interested in and simply ignore other sentences that is doesn't care about. In the NMEA standard there are no commands to indicate that the GPS should do something different. Instead each receiver just sends all of the data and expects much of it to be ignored. Some receivers have commands inside the unit that can select a subset of all the sentences or, in some cases, even the individual sentences to send. There is no way to indicate anything back to the unit as to whether the sentence is being read correctly or to request a re-send of some data you didn't get. Instead the receiving unit just checks the checksum and ignores the data if the checksum is bad figuring the data will be sent again sometime later.

Dead-reckoning fixes are reported by GPS receiver 104 or 302, and 700 in both ASCII-formatted NMEA strings as well as the functional API. A dead-reckoning fix is indicated in NMEA format in a $GPGGA string by the fix indicator value of six. The GPS fix value is one. The dead-reckoning fix is reported by value in the functional API. Dead-reckoning also provides a speed estimate by dividing the delta-range by the known observation period. Both of these parameters are visible in a NMEA $GPRMC string and also the functional API. These fields will only report a dead-reckoning fix after a valid calibration is achieved.

The calibration status can be viewed in a string. A dead-reckoning debug message is available in standard NMEA format that is useful for detailed monitoring of the dead-reckoning calibration progress and status. For example, see Table-VI. It is output with standard NMEA outputs from a core library, but the message must be solicited, and then sent to an output port or file.

TABLE VI

PERDCR, 11 NMEA Sentence Detail

Field Number:
1) confident: confident flag to indicate the DR calibration status, 1 number:
    a. 0 - DR calibration hasn't started
    b. 1 - a is confident
    c. 2 - b is confident
    d. 3 - a and b are confident
    e. 4 - heading calibration is confident
    f. 7 - DR calibration is complete, calibrations are all determined, unit will now run in DR mode
2) Mode: current DR mode:
    a. 0 - GPS only mode
    b. 1 - DR only mode
    c. 2 - Mixed mode (GPS with DR combined)
3) a1: DR a1 parameter, 7 characters
4) a2: DR a2 parameter, 7 characters TABLE VI-continued PERDCR, 11 NMEA Sentence Detail 5) b1: DR b1 parameter, 7 characters
6) b2: DR b2 parameter, 7 characters
7) Heading offset: calibrated DR heading offset parameter, difference between DR heading and GPS heading, 7 characters.
8) Left Wheel Count: left wheel count change between last update and this update (normalized to delta time), 4 characters
9) Right Wheel Count: right wheel count change between last update and this update (normalized to delta time), 4 characters
10) Speed: fixed speed from GPS or DR measurement, meters/sec, 4 characters
11) Heading: fixed heading from GPS or DR measurement, degrees (compass heading), 3 characters
12) CAN Frames: how many DR packets received between last update and this update, (normally 10 packets for 100 msec CAN period), 2 characters
13) Latency: timetag offset between CAN timer and OPUS timer (only display lower 8 bits), 3 characters
14) Jitter: maximum of change in DR CAN timetags during last update and this update. Here it is just the maximum value of the difference between delta timetag and 100 msecs for all the packets since the last PERDCR, 11 sentence; 2 characters
15) Wheel direction: F - Forward rotation, R - Reverse rotation
16) Position Sigma: position error in meters (range limited to 0-999), 3 characters. In DR-only mode reflects the DR error estimate. In GPS-only represents GPS error estimate.
17) Checksum (for NMEA corruption checking)

There is no expiration time associated with any saved calibrations. A new calibration will start as soon as the GPS/dead-reckoning is enabled with a command and the CANbus packets are available. The status level of the last calibration is not affected by the age of the calibration.

Knowing the physical parameters for vehicle 110 allows an initial calibration to be entered into a calibration algorithm through API 722. The A and B parameters are initialized according to the left and right radius ($R_l$, $R_r$), counts per rotation (CPR), and track width (TW). Dead-reckoning mode 601 will not be possible until a first GPS fix is made at sufficient velocity so that a good heading offset can be established.

API 722 provides a way for manufactures to initialize system 700 and thereby quicken when a calibration will be available, and API 722 and output API 746 enable functional system tests of the CANbus packet processing 726 and 730.

Data that indicates which source of CANbus data to use will, in general, be provided by the host CPU application every GPS session since the same application thread is used at the start of each session. Often this will include sending the physical parameters. It is assumed that the physical parameters input by a manufacturer can not be as accurate as any that are estimated during operation with GPS receiver 104 or 302 running.

Accurate calibrations require knowing the physical parameters very precisely. Even the seemingly small effects of tire pressure will significantly affect the actual radius of wheel and can change over the course of a day and a night. For this reason, factory physical parameters should only be loaded when a previous run of GPS calibrated data has been cleared. This means a previous GPS based calibrations will not be overwritten with the factory parameters through the API.

It is expected that in most production cases, manufactures will not know the actual wheel radii accurately enough to provide high confidence dead-reckoning. For example, there might not be full tire pressure, or equal pressure in each wheel.

If a user wants rapid availability and is able to provide high accuracy calibration, dead-reckoning can be made available as soon as GPS is available and vehicle 110 is moving. But if the manufacturer is only able to provide a reasonably accurate calibration, within a few percent, there may be a small accuracy penalty before a full GPS-based calibration installs itself. This might be the case for an air-bag deployment application, where dead-reckoning availability is more important initially than full accuracy.

In a low accuracy factory mode, physical parameters are used as the calibration initial condition and are internally classified as accurate, but the externally observable calibration confidence is set to zero. Dead-reckoning becomes available after a GPS based calibration can polish the initial parameters and complete a normal calibration process. This mode is selected when to speed up calibration and not allow dead-reckoning until a GPS calibration is completed. The time to a valid dead-reckoning calibration is faster than if no starting values are provided.

A laboratory test mode provides for software and system functional validation, and is used for laboratory testing. The previous run file is deleted before and after tests are completed to avoid problems in other factory modes. Dead-reckoning is available immediately without any additional calibration. The starting heading always starts from zero, and does require a starting position. The position can be installed via the position input API after sending the physical parameters command, or by obtaining a GPS fix.

A test vehicle's calibration can be transferred to a family of similar vehicles where immediate dead-reckoning is a higher priority than having initial accuracy. If dead-reckoning is required immediately, and it is not possible to calibrate each vehicle individually in the factory, then a single vehicle is selected to be a representative of a family of vehicles. It is configured for factory default mode. No initial calibration is required, and a test driver can run a calibration suite to garner a GPS-based calibration. A PERDCR, 11 NMEA message, as in Table-VI, is enabled and logged during the calibration run on a storage computer. A NMEA file is retrieved from the storage computer, and the A and B calibration parameters are extracted from a final PERDCR, 11 string. The physical parameters are estimated from the calibration parameters. The physical parameters are loaded in the factory during installation and a factory high accuracy calibration function is selected. The host CPU application is configured to read the physical parameters either from a file, or they are hard-coded into the host CPU application. The family of vehicles will then be able to observe rapid dead-reckoning as soon as the first GPS fix is obtained at a sufficient velocity, e.g., more than twenty-five kilometers per hour.

Simple mathematics is used to extrapolate the physical parameters from the calibration parameters. The estimated calibration parameters are easily plucked from a proprietary NMEA string PERDCR, 11. The calibration parameters observed in PERDCR, 11 have units and scaling, $$A_L = R_l/CPR/TW*360*60 \text{ (minutes/tick)};$$

$$A_R = R_r/CPR/TW*360*60 \text{ (minutes/tick)};$$

$$B_L = R_l/CPR*PI*1000 \text{ (millimeters/tick)};$$

$$B_R = R_r/CPR*PI*1000 \text{ (millimeters/tick)}.$$

The estimated calibration parameters from the PERDCR, 11 are defined by,
$A_L'$=estimate of true $A_L$;
$A_R'$=estimate of true $A_R$;
$B_L'$=estimate of true $B_L$
$B_R'$=estimate of true $B_R$.
The track-width physical parameter (TW) are estimated with, $$TWl' = B_L'/A_L'*(360*60)/(PI*1000) \text{ (meters)};$$

$$TWr' = B_R'/A_R'*(360*60)/(PI*1000) \text{ (meters)}.$$

A calibration algorithm guarantees that the ratio of B/A for both wheels will be the same. Either the left or right wheel parameters can be used. Another approach is to average these two estimates so that, $$TW' \text{ estimate} = (TWl' + TWr')/2.$$

Unfortunately, the wheel radius ($R_l$, $R_r$) cannot be separated from the counts per rotation (CPR). These parameters are always coupled as in the equations above. Each vehicle manufacturer supplies the CPR in a set of physical parameters. In this case, the wheel radii are estimated as follows, $$R_l = B_L'*CPR/PI/1000;$$

$$R_r = B_L'*CPR/PI/1000.$$

A real-time calibration method embodiment of the present invention has three steps: (1) compare the delta-range to GPS speed to estimate the $B_L$ and $B_R$ parameters; (2) Given the B parameters, compare the delta-heading to the change in GPS heading to estimate the $A_L$ and $A_R$ parameters; and (3) Given the A and B parameters, the GPS heading is used as the absolute reference to estimate the heading offset.

Before being able to compute a dead-reckoning fix, there must be (a) a valid calibration of parameters A and B, the heading offset, (b) a valid position, and (3) an inflow of synchronized time-stamped CANbus data packets.

GPS receiver 104 or 302 does not require an estimate of GPS time in order for the dead-reckoning only mode 601 to operate. This allows "garage mode" to proceed even though GPS receiver 104 or 302 is not providing time information. A valid calibration, as represented by previous run data 750 in FIG. 7, can be provided from either the non-volatile memory data or input through the API.

Dead-reckoning calibration automatically commences without any initialization from an API command, e.g., as soon as any CANbus packets are received. The time to a usable calibration depends on the availability of GPS data and on the completion of straight runs and turns that include a large heading change. The time to get calibrated is reduced by higher speeds, because more ticks can be observed and the quantization effects are proportionately reduced.

The calibration of the B-parameters, the wheel radii and ratio, require either straight driving segments or runs of GPS receiver 104 or 302 where the heading changes cancel, such as in figure-eights or straight driving. A minimum requirement is an exercise of at least five such segments. After that, the A calibration will compute the track width and then advances to turning exercises. Right angle turns are superior to circles with a minimum of five. The heading offset can then be calibrated after parameter-A and parameter-B are obtained.

Thus the minimum requirements to collect and produce a calibration are straight segments are at least 70 meters without high acceleration, at least five right angle turns, and a short straight segment of at least three meters per second for five seconds to obtain heading offset. Such example had unfavorable signal levels of 34 dB-Hz.

The wheel turning tick sensors 120, 122, 124, and 126 (FIG. 1) are generally Hall-type devices that generate electrical ticks, like digital clock ticks, as the wheel spins magnetic bumps past a detector. The number of ticks produced for one rotation of the wheel can range from forty-eight ticks in Peugeot vehicles, to ninety-eight ticks for Mercedes vehicles.

The original strings of wheel turning ticks produced by the sensors are continuous, but the CANbus 130, by necessity, must group The wheel-ticks together into data packets every 1-10 milliseconds for multiplexing. A secondary process groups these shorter packets into longer packets each spanning one hundred milliseconds, e.g., a rate of 10-Hz. These 10-Hz CAN wheel turning tick packets are accessible by external applications through a protective gateway between a secure safety-of-life network and an external application network.

The CANbus 130 has a processor (CPU) with a system clock that is used to generate wheel turning tick sampling windows. Such CPU clock is generally not available outside for synchronization, so the time domains between the 10-Hz packet generation and any GPS receiver clock have to be treated asynchronously.

In embodiments where the CANbus and GPS receiver clocks can be synchronized, carrier Doppler, codephase, and other GPS observations could be taken over the same time window. Such would be a good way to synchronize with a one pulse per second (1-PPS) pulse from a master to the slave. Another embodiment uses the same clock or a time-difference or freq-difference circuit to observe the relative time or frequency differences between the two clock domains. The eRide (San Francisco, Calif.) OPUS™ baseband chip has such capabilities, but using it dramatically complicates system integration.

CANbus data synchronization is further complicated by the delays that are inherent to sending packet messages over a network, such as CANbus 130 and GPS receiver 104 or 302. Typically, a third CPU is physically connected to the CANbus 130 to convert from the CAN protocol to a proprietary protocol because every manufacturer seems to use different CAN message protocols and wheel turning tick formats. Such CPU makes a conversion to a common format for the GPS receiver's CAN input. Delays arise three ways, (1) from the delay on the CANbus 130, (2) from the delay in the CAN format converter, and (3) in a receive buffer included in GPS receiver 104 or 302. The combination of these delays is referred to as "CANbus jitter" and has a constant part and a variable part.

The combination of CANbus jitter and any time drift between the CANbus clock and the GPS clock causes a noise element in the synchronization and processing of CAN and GPS data.

The synchronization is obtained by time stamping each CANbus packet as they arrive in the GPS receiver buffer through a universal asynchronous receiver-transmitter (UART) serial interrupt driver.

The GPS receiver software running as a host CPU program must select which packets are closest in time to the GPS time window in order to use the CANbus data for both calibration and dead-reckoning propagation. A typical window is one second. There would normally be ten packets with time tags inside each GPS one second time window.

In a Mercedes system experiment, it was observed that the time tags would shift rapidly, and that in only a few minutes, there would actually be eleven packets, indicating that the CANbus clock was running fast, or nine packets, indicating the CANbus clock was running slow. CANbus jitter was also seen as responsible for variations of nine or eleven packets in a typically one second gathering operation.

Such problem has a simple solution. First, the offset between a noisy packet's start time and GPS window time is filtered to remove most of the jitter. The average difference is maintained. It is a bias with a drift component, so the filter is configured to track the change. The original time tags with jitter are used to select the packets that contain both the start and end intervals in the GPS time domain. Next, the average difference is used to define the portion of the packets that has the GPS fix times. The packet contribution inside the GPS interval is interpolated from the total counts of the packet.

For example, in a packet that has a start GPS time, the part that is earlier than the GPS time and the expected packet time, by subtracting the average difference, is interpolated out leaving the part that occurred after the GPS start time. Similarly, for a packet that has data that occurred after the GPS end time, the interpolation removes any time periods after the GPS time, assuming the portion used is from the GPS end time to the expected packet start time using the average difference. The other packets between these two boarder packets are used in their entireties.

Such techniques are used for ticks from both the left and right wheel sensors 124 and 126 so that an interpolated wheel turning tick count is tailored that best matches the corresponding GPS time intervals.

The GPS starting time and ending time are different for the delta-range and delta-heading equations. For delta-range measurement, the GPS velocity over one second is compared the total wheel turning ticks in the same interval. The one second integration of GPS velocity is used since the GPS carrier tracking wavelength is 0.1904 meters, and is determined within a few degrees using a conventional phase lock look method common to GPS based velocity determination. The GPS code phase on the other hand has a wave length corresponding to one chip of 293-m. Thus, the delta-range in one second from code phase is much too noisy for short term calibrations.

Long term calibrations with GPS derived position solutions are possible, but they require significant processing and memory storage.

A preferred embodiment uses east and north speed from a GPS velocity solution as a main calibration source. delta-range from GPS is defined as the square root of the sum of the easterly speed squared plus the northerly speed squared. Heading is defined as the four-quadrant result of the inverse tangent (arctangent) of the easterly speed divided by the northerly speed. The east and north speeds comprise both sign and magnitude.

The GPS east and north speeds themselves are estimated from the GPS Doppler measurements. A Doppler measurement is an average of carrier Doppler frequency divided by the measurement interval. The time of applicability for the measurement is the center of the window.

For delta-range calibration, the wheel turning ticks are selected with starting and ending times approximate to the GPS measurement starting and ending times.

The velocity fix is made at the center of a one second window defined by time-track state machine (TSM) measurements. The heading of the GPS fix applies at the center of the TSM window. The timing sees that transitions from GPS to DR do not cause a time tag jump.

Ticks-left (TL) and ticks-right (TR) are defined as the wheel ticks in one second. For headings, TL and TR have a time window from the previous window center to the new window center. The coefficients are, $$A_L = \text{RadiusLeft}/\text{CPR} * \text{TRACKWIDTH} * \text{degrees} * 60 \text{ (minutes/tick)};$$

$$B_R = \text{Radiusleft}/\text{CPR} * 1000 \text{ (millimeters/tick)}.$$

The delta heading in one second is, $$\delta h = A_L * TL - A_R * TR$$

And, $$A_L = A + dA$$

$$A_R = A - dA$$

$$\delta h = (A + dA)TL - (A - dA)TR$$
$$= A * [TL - TR] + dA * [TL + TR]$$

When DH=0, as determined from GPS measurements, an arc has closed or traveled strait for a while, Then, $A_L * TL = A_R * TR$ $$A_L/A_R = TR/TL$$

$$\alpha = A_L/A_R = (A+dA)/(A-dA)$$

Forming $(1-\alpha)/(1+\alpha)$ and solving, $$(1-\alpha)/(1+\alpha) = -dA/A$$

So $dA = -A(1-\alpha)/(1+\alpha)$

For delta range, define that The wheel-ticks are the raw ticks that span the same time frame as the TSM window.

$$\delta h = A * [TL - TR] - (1 - \alpha)/(1 + \alpha) * [TL + TR]$$
$$= A * [(TL - TR) - (1 - \alpha)/(1 + \alpha) * (TL + TR)]$$

The delta range in one second is, $$dr = B_L * TR + B_R * TR$$

And, $$B_L = B + dB$$

$$B_R = B - dB$$

resulting in, $$dR = (B + dB) * TL + (B - dB) * TR$$
$$= B * (TL + TR) + dB * (TL - TR)$$

Because of the definition of $B_L$ and $B_R$ in the physical parameters, $$B_L/B_R = A_L/A_R$$

So, $$dB = -B(1-a)/(1+\alpha)$$

$$dr = B*(TL+TR) - B(1-a)/(1+\alpha)*(TL-TR)$$

$$dr = B*[(TL+TR) - (1-\alpha)/(1+\alpha)*(TL-TR)]$$

To compute a dead-reckoning fix that propagates a position by one second from a previous fix time, deltaN=$dr$*cos heading(delta-north);

deltaE=$dr$*sin heading(delta-east);

heading $h(t_i) = h_0 + \Sigma dh_n$ $(n=0,i)$.

Assume that estimate a nominal calibration of $A_L$, $A_R$, $B_L$, $B_R$
1) To estimate alpha, find a section of trajectory where $+\Sigma dh_n$ $(n=0,i)$ GPS is zero. IN this case, the ratio of the right to left ticks defines
   a. $\alpha = TR/TL$
2) to estimate B, obtain a dr estimate from GPS and same The wheel-ticks from the same observation window as the GPS range change observation window $$B = dr/[(TL+TR) - (1-\alpha)/(1+\alpha)*(TL-TR)]$$

3) to estimate A, obtain a dh estimate from GPS and get the CAN ticks from the same observation window as the GPS heading change observation window $$A = \delta h/[(TL-TR) - (1-\alpha)/(1+\alpha)*(TL+TR)]$$

4) to estimate $h_0$, maintain difference of sum(dh) and GPS heading when GPS heading is confident
DR is short term stable and long term unstable
GPS is short term unstable and long term stable
The calibration is obtained using point observations. These observations are each derived from velocity information that is zero mean, but the integration is non-stationary. In order to get a final calibration that is stationary, information from the GPS position is needed.
For a long observation of dE and dN from GPS, DE$_{gps}$=ΣdE$_{gps}$ DN$_{gps}$=ΣdN$_{gps}$ For a similar estimate formed from a short term calibrated DR, DE$_{dr}$=ΣdE$_{dr}$ DN$_{dr}$=ΣdN$_{dr}$.

For a similar estimate formed from a short term calibrated DR, a three-point sum is used for example:

DE$_{dr}$=ΣdE$_{dr}$=$dr1$*sin($h0+dh1$)+$dr2$*sin($h0+dh2+dh2$)+$dr3$*sin($do+dh1+dh2+dh3$);

DE$_{dr}$=ΣdE$_{dr}$=$dr1$*cos($h0+dh1$)+$dr2$*cos($h0+dh2+dh2$)+$dr3$*cos($do+dh1+dh2+dh3$)

The A and B estimates are assumed to be accurate enough so that a first order Taylor series can be employed.

Figure 8:
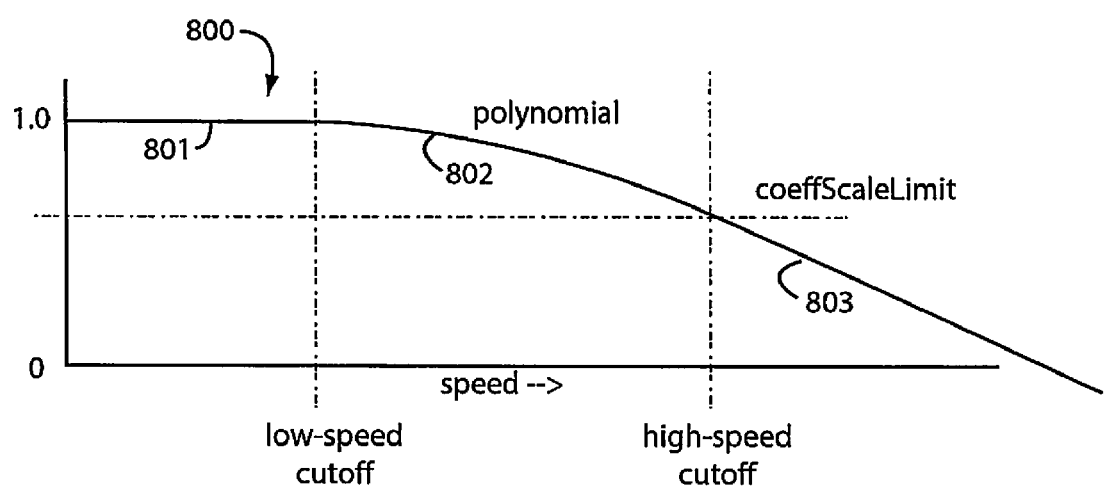
FIG. 8 is a graph diagram showing the speed effect in wheel radii.

Embodiments of the present invention compensate the turn ticks for a speed-effect phenomenon represented with a curve 800 in FIG. 8. A low speed segment 801 below a low speed cutoff is essentially a flat line. A middle speed segment 802 between the low speed cutoff and a high speed cutoff follows a polynomial function, $1+c_{1st}(s-S_L)+c_{2nd}(s-S_L)^2$. A high speed segment 303 is beyond a coefficient scale limit.

The speed related effect causes a variation in the differential number of left and right wheel ticks in turns over speed because of wheel radii changes. In other words, the same turns taken at different speeds will yield dissimilarities in the count difference in the number of left and right wheel ticks. The cause is wheel warping and the vehicle suspension reactions.

At higher speeds, a higher amount of turning energy, seen as a difference in wheel ticks, develops compared to lower speeds. Of course, there are more wheel ticks per second at higher speeds, so the apparent angular velocity computed from the turn ticks has to be compensated for speed.

The turn ticks that go into each basic delta heading update must be appropriately compensated, where, delta Heading=$A$*turn ticks.

Turn ticks are routinely compensated based upon difference in wheel radius when going straight, $$\text{Delta heading} = Aleft * WheelTicksLeft - Aright * WheelTicksRight$$
$$= A * (WheelTicksLeft - WheelTicksRight) -$$
$$alpha * (WheelTicksLeft + WheelTicksRight)$$
$$= A * \text{compensated turn ticks}$$
$$= A * compTT.$$

Uncompensated turn ticks are, turnTicks=left wheel ticks−right wheel ticks.

A low-speed compensation (1) related to segment 801, for the wheel radius is, compensated turn ticks(1)compTT(1)=turn ticks−alpha*sum ticks;

alpha=1−ratio/1+ratio, where, "ratio" is a filtered value of wheel-ticks-right divided by wheel-ticks-left when not turning.

Segment 802 compensation for speed effects CompTT(2) scales the compTT(1) by polynomial, $1+c_{1st}(s-S_L)+c_{2nd}(s-S_L)^2$, which is a function of the sum ticks,
where,
s=sum ticks
$S_L$=a reference point
below a low speed cutoff, polynomial=1,
Above a high speed cutoff, polynomial=coeffScale limit.

Figure 9:
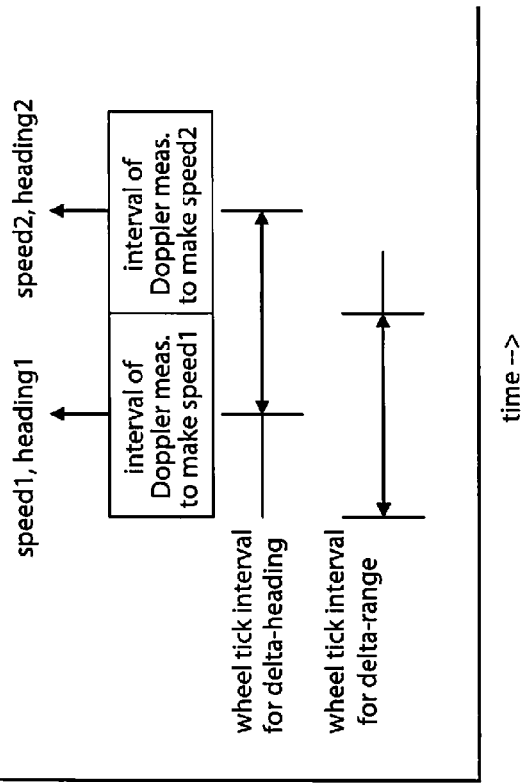
FIG. 9 is a time line diagram representing the difference in time tags for two consecutive GPS heading observations.

In a delta-heading calibration, the difference of two consecutive GPS heading observations is used, as represented in FIG. 9. The time tag of each individual heading is the center of the GPS measurement window. Thus, the difference of two GPS headings has a time of applicability between the two time tags of the two GPS headings. For this reason, the wheel turning ticks used for delta-heading are in a different time window than those for delta-range, and can be either half a second in advance, or a half second late, from the delta-range window depending on whether the delta-range is the earlier or later speed used to form each heading respectively.

In practice, the earlier (or delayed) speed1 is used for delta-range since there can be a delay in the reception of all the CANbus packets needed to span the interval of speed2 since it requires more prompt data over the CAN communication line, e.g., the CAN to converter to the GPS serial port.

In general, the basic equations for left and right wheel turning ticks use a simplified scale factor on each wheel.

DH=delta-heading=$A_{left}$*ticks left for DH−$A_{right}$*ticks right for DH;

R=delta-range=$B_{left}$*ticks left for DR+$B_{left}$*ticks right for DR.

Also, DR heading=initial heading from GPS+sum DH;

Then, Delta East=DR sin(DR heading);

Delta North=DR cos(DR heading).

Experiments have shown that the estimation of the parameters is not as simple as it would appear. It turns out that parameters A, and B are not at all constant. They are time varying because the radii of the wheels change with tire pressure, external temperature, speed, turning effects, vehicle loading, the placement and number of passengers, tire wear, etc. A solution described here is to model each parameter as a slowly varying parameter, each according to a different time model.

Although it might be possible to solve all the parameters in a multivariable non-linear system of equations, it has been found in experiments that each parameter can be computed independently in a system of single variable equations, if done in the right order.

Rather than solve for each left and right parameters for A and B, $A_{right}/A_{left}=B_{left}/B_{right}=r$ The delta-heading for one second is, $\delta h = A_L * TL - A_R * TR;$ And, $A_L = A + dA;$ $A_R = A - dA;$ $\delta h = (A + dA)TL - (A - dA)TR;$
$= A * [TL - TR] + dA * [TL + TR];$ And, $r = A_L/A_R = (A + dA)/(A - dA);$ Re-arranging, $dA = -A(1 - r)/(1 + r).$ So, delta-heading $= A * [TL - TR] - (1 - r)/(1 + r) * [TL + TR]$
$= A * compTT;$ where, the compensated turn tick energy, compTT=(T−TR)−(1−r)/(1+r)*(TL+TR).

In a similar manner, solving for a common B-parameter, delta-range $= B * [(TL + TR) - (1 - \alpha)/(1 + \alpha) * (TL - TR)]$
$= B * compST;$ where, compST=compensated sum ticks.

A simple formulation handles the general case in which the left and right wheels do not effectively have the same radii. A bias between the left and right wheel ticks will accumulate even if vehicle 110 is going straight.

A simple way to estimate this parameter is to use the GPS receiver 104 or 302 to isolate driving conditions in which vehicle 110 is going straight, or with insignificant turns. Under this condition, the ratio "R" can be estimated as, R=sum ticks right/sum ticks left;

over a period in which any change in the GPS heading from the start of the integration to the end of the integration is small change in GPS heading. That is, the start and end periods are considered when the absolute value of (headGPSstart−headGPS) is less than a threshold of typically one degree.

The delta-heading estimate includes any GPS heading errors, and any true change in vehicle 110 heading causing correct turn energy in the wheel turning tick difference.

To accommodate this and all the general changing conditions, the individual r estimates are blended in a single-state Kalman filter. A noise model for each measurement accounts for the confidence in the two GPS heading estimates. The process noise model for the Kalman filter is adjusted to accommodate how fast the ratio parameter can change.

The process noise is set large any time vehicle 110 stops for a long time, since vehicle loading changes can significantly affected the tire radii. Leveling the process noise in steady state allows the ratio estimate to accommodate changes in conditions every five minutes.

When operating in urban canyon and/or very weak signal conditions, the GPS heading estimates can be erratic and unreliable. A very large noise model has to be used. A culling scheme is used to cull out any outlying measurements from the corresponding Kalman filter that appear to have wandered too far from normal values.

Such ratio can be estimated whenever vehicle 110 is going straight or the net heading change cancels to zero, e.g., a turn left 15-degrees followed by a turn right 15-degrees. The ratio compensates for differences in the wheel radii and straightens out the run. Blindly applying a ratio of 1.0 can cause the dead-reckoning propagation to plot out paths with wide curves even when actually traveling on a straight road.

In experiments, is has been found that terms A and $A_{left}$ and $A_{right}$ can deviate from reality during turning because of the way vehicle 110 suspension operates. In general, there is more observed turning energy causing an impression of oversteering, that is, the ground tracking would show a larger than true heading change.

To compensate this effect, a speed compensation parameter "C" is introduced here too further compensate the turn ticks already compensated for by any real differences in wheel radii. The general form of the C-parameter is a value 0:1. At low speeds, the C-parameter is closer to zero and at high speeds, it converges but never quite reaches one.

The C-parameter is more difficult to estimate because it requires observation of turning conditions over the complete range of speeds possible for vehicle 110. So, a baseline or default model is employed. The C-parameter is constantly refined with another single-state Kalman filter over the life of vehicle 110.

The typical form of the C-parameter is a unit from zero speed up to a baseline value called LowSpeedCutOff. The curve then falls linearly up to a maximum speed at which the curve stays flat at a fixed lower value. The slope in the middle region is estimated in real time. The independent variable to simplify a representation of speed is the sum of the left and right wheel turning ticks, referred to herein as sumTicks.

A modeling equation to estimate the C-parameter is, deltaHeading=$A*(1+C*$(compST−LowSpeedCutOff))$*$ compTT.

The estimate of the C-parameter can be formed as, $C$ estimate=(deltaHeadingGPS−$A*$compTT)/($A*$compTT$*$(compST−LowSpeedCutOff)).

A baseline estimate of the A-parameter is required, and the C-parameter is in dimensionless units.

The A-parameter converts a change in the wheel turning ticks between the left and right wheels into a heading change. The heading change is then integrated along with an arbitrary constant to produce a total dead-reckoning heading. Computing the A-parameter requires collecting at least two GPS velocity estimates that can yield a delta-heading, and collecting a compensated turn ticks estimate that corresponds to the same integration period. Thus, $A$-estimate=deltaHeadingGPS/(compTT$*C$);

where, A-estimate is in radians per turn tick.

Experiments show the accuracy is dependent upon the quality of the GPS heading measurements. The software programming should have at least two methods for estimating the heading. For example, a least squares batch estimator that estimates the east and north velocity from a set of GPS Doppler measurements taken in one time interval so it has no lag under dynamics as it has no dynamics model. In another example, the estimator comprises a navigation Kalman filter with complex measurement error models for each GPS Doppler measurement, and complex models for how the GPS velocity and position change from epoch to epoch. Under weak signal conditions with higher noise ratios, Kalman filters provide less variability in the east and north velocities.

One more single-state Kalman filter is used to blend a time-series of A-estimates together. Each A-estimate has a measurement error model based on the error model in the GPS heading constituents. A process noise model is included that sets the time constant of the filter to slowly adapt to changing tire conditions.

The A-estimate depends on two other parameters, a wheel radius ratio r and a speed compensation model C. The A-parameter is continuously estimated from an initial live operation and uses a value of one for the ratio and a default model until each parameter can be estimated.

In estimating parameter-B, the delta-range parameter B is used to set the speed for dead-reckoning. It converts the sum of the left and right wheel turning ticks into the dead-reckoning speed. Parameter-B is estimated using the GPS speed and the compensated sum ticks measurement, compST, $B$-estimate=GPS speed in one second/compST in one second.

The B-estimates are blended in a single-state Kalman filter where the measurement noise is function of the GPS speed error estimate. The process noise for the Kalman filter sets the time constant of how B changes with time. In general, the tires will compress and expand at various speeds and vehicle loads. Thus, the amount of process noise to include is set to have as much as a five minute time constant.

For a heading offset O-parameter, it is necessary to have an absolute heading estimate from dead-reckoning, in order to estimate the dead-reckoning position change from a set of new left and right wheel turning ticks. This parameter is referred to herein as the DR_heading, DR_heading=heading offset+sum of all delta-headings.

The heading offset is initially set when the first confident GPS heading is available, e.g., as soon as the GPS receiver moves at a speed above a few meters per second. To initialize, Heading offset=Heading from last fix And to update, DR heading on first update=heading offset+deltaHeading1;

On a second update, $DR$ heading = heading offset + $deltaHeading1$ + $deltaHeading2$;

= heading offset + sum of all $DR$ $deltaHeadings$;

= heading offset + $sumDeltaHeading$.

If the sum of all such delta-heading estimates were perfect, then the heading offset would be a fixed constant and would never need to be updated. But in practice, the heading offset can change fairly rapidly due to system noise and mis-modeling. Another signal state Kalman filter is needed to continuously estimate heading offset to keep the heading offset accurate.

The heading offset estimate,$O$=GPS heading−sumDeltaHeading;

and is blended with all the heading offset estimates according to a measurement noise model based on a GPS heading error estimate. The time constant is set to about five minutes.

In summary, the calibration proceeds as follows in Table-VII,

TABLE VII

Calibration Method Summary

1. Form sum of ticks left and ticks right between two confident GPS heading where delta heading from start time to current time < threshold1
   a. Estimate ratio as sumTicksRight/sumTicksLeft
   b. Filter ratio in ratio KF to generate stable ratio
2. If ratio KF is initialized enough
   a. Integrate compTT between two confident GPS headings where delta heading > thresholds and update:
      i. A estimate = deltaGPSheading/compTT
      ii. Filter A in A KF to generate stable A
   b. Every second when GPS speed is enough, form compST and update:
      i. B estimate = GPS speed/compST
      ii. Filter B in B KF to generate stable B
3. When A KF is initialized enough
   a. Use the KF A estimate and use the compTT between two confident GPS headings and its corresponding compST and update:
      i. C estimate = (deltaHeadingGPS − A*compTT)/(A*compTT*(compST − LowSpeedCutOff))
      ii. Filter C in C KF to generate stable C
4. If filtered A, B, C are available, then every second form delta heading TABLE VII-continued Calibration Method Summary a. Delta heading = Afilt * compTT * Cfilt
   b. Update DR delta heading sum = last DR sum delta heading + delta heading
      i. O estimate = GPS heading − DR delta heading sum
      ii. Filter O in O KF to generate stable O
5. Finally, form the Dead-reckoning change in position
   a. Delta Range = Bfilt * compST
   b. Update DR heading = Ofilt + DR delta heading sum
   c. Delta east = delta range * sin (DR heading)
   d. Delta north = delta range * cos (DR heading)
   e. Add delta east and delta north to last position to update position
   f. Declare delta east and delta north the new DR velocity One embodiment of the present invention comprises a tightly coupled GPS and dead-reckoning navigation software application program for execution as a GPS application in a host computer.

Such is connected to receive measurements from a GPS measurements platform (MP) aboard a vehicle with wheels. For example, MP 704 (FIG. 7) aboard vehicle 110 (FIG. 1) with wheels 112, 114, 116, and 118. The tightly coupled GPS and dead-reckoning navigation software application program includes an input process for collecting time, fix trigger, Doppler, and pseudorange reports from the GPS measurements platform. A GPS-time to host computer time offset calculation process is used for aligning otherwise asynchronous data generated by the vehicle to GPS time. A least squares snapshot estimate is calculated for position (P), velocity (V), calibration parameters for the wheel radii and ratio (B), delta-heading and delta-range (D), and time based on each new position fix and GPS system time. A Kalman Filter is included and configured for position (P), velocity (V), calibration parameters for the wheel radii and ratio (B), delta-heading and delta-range (D), and time and for processing dead-reckoning delta-range, delta-heading, mixed modes, and propagation.

A continuous mode selection process selects operating in a GPS only mode, a dead-reckoning only mode, or a mixed mode of both GPS and dead-reckoning, depending on an availability of GPS solutions and wheel data calibrations. A new fix computation process computes hardware preposition data and adjusts a GPS millisecond timer connected to the time offset calculation process. A buffer processor collects time-stamped CANbus data related to wheel turning ticks measured by a vehicle's wheel transducers. A dead-reckoning calibration Kalman filter processes $A_L$ and $A_R$ calibration parameters for delta-heading/tick difference for left and right wheels, and $B_L$ and $B_R$ calibration parameters for delta-range/tick for left and right wheels, and a heading-offset calibration parameter to translate a sum delta-heading to a known heading reference. A dead-reckoning data processor converts data from the buffer processor into delta-range, delta-heading, and delta-heading sum information for subsequent processing by the Kalman Filter, and includes a dead-reckoning error model. An applications programming interface (API) outputs new navigation fixes.

The tightly coupled GPS and dead-reckoning navigation software application program can further include a mode selection process for operating in one of three modes including GPS receiver only, DR-computer only, and a mixed mode including both the GPS receiver and the DR-computer. Operation in the GPS receiver only mode results when GPS fixes are available, there are enough consistently available satellite vehicles, and more than two satellite vehicles are being tracked. Operation in the DR-computer only mode results when a GPS fix is not available, or less than two satellite vehicles are being tracked. And, operation in the mixed mode results from tests when less than two satellite vehicles are being tracked, or there are not enough consistently available satellite vehicles, and a calibration is available and verified. New navigation fixes are thereafter output through the API.

In Summary, Table-VIII describes the parameters for wheel ticks in a CAN frame, and Table-X lists the Speed Compensation Parameters to set by API.

TABLE VIII

Parameters for Wheel Ticks in CAN Frame

| Parameter name | Contents |
|---|---|
| A | The parameter to calculate delta-heading |
| B | The parameter to calculate delta-range |
| Ratio | Ratio of Left/Right wheel ticks |
| Offset | Heading offset |
| C | The speed compensation parameter to adjust A parameter |

TABLE IX

Speed Compensation Parameters to set by API

| | LIGHT | MEDIUM | STRONG |
|---|---|---|---|
| Coeff1stOrder | −18.3 [ppm/ticks] | −183.3 [ppm/ticks] | −186.0 [ppm/ticks] |
| Coeff2ndOrder | 0.000 [ppm/ticks^2] | 0.000 [ppm/ticks^2] | −0.186 [ppm/ticks^2] |
| CoeffLSB | −30 | −30 | −30 |
| LowSpeedCutOff | 128 [ticks] | 128 [ticks] | 128 [ticks] |
| CoeffScaleLimit | 85 [%] | 75 [%] | 60 [%] |

Algorithm

A modeling equation for estimating C1 is, $$dh = A*(1 + C1*(\text{Sum}T - \text{LowSpeedCutOff}))*dT.$$

rearranging, $$C1 = (dh - A*dT)/(A*dT*(\text{Sum}T - \text{LowSpeedCutOff}))$$

Where,
TL: Left wheel ticks
TR: Right wheel ticks
A: The parameter to calculate delta-heading
Ratio: Ratio of Left/Right wheel ticks that is estimated for the equation of "Ratio=TL/TR".
SumT: Sum of wheel ticks is defined as "SumT=TL+TR"
dT: Difference of wheel ticks is defined as, "dT=(TL−TR)+(1−Ratio)/(1+Ratio)*SumT".

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. An improved vehicle location system, comprising: a GPS receiver carried aboard a vehicle and subject to interruptions of signal transmissions from orbiting navigation satellites; a DR-computer coupled to the GPS receiver and providing for range and heading information computed by dead-reckoning during periods of said signal interruptions, and such that vehicle location solutions are provided to a user; wheel-tick sensors coupled to the DR-computer and providing for rotational data related to the rotation of individual wheels that carry said vehicle; wherein, one or more parameters estimated to account for true radii of said individual wheels are combined with said rotational data from the wheel-tick sensors to generate delta-range information indicative of change in range, and delta-heading information indicative of change in heading, related to movements of said vehicle; wherein, said delta-range and delta-heading information are propagated by the DR-computer from absolute position information periodically obtained from the GPS receiver, with dead-reckoning location alone sometimes being output as a vehicle location solution; and wherein, said vehicle location solutions are derived solely from the GPS receiver, solely by the DR-computer, or from a mix provided by the GPS receiver and the DR-computer.

2. The vehicle location system of claim 1, further comprising: a computer program for choosing and deriving said vehicle location solutions solely from the GPS receiver, solely from the DR-computer, or from a mix provided by both the GPS receiver and the DR-computer.

3. The vehicle location system of claim 1, further comprising: a computer program for operating in one of three modes including GPS receiver only, DR-computer only, and a mixed mode including both the GPS receiver and the DR-computer; wherein, operation in the GPS receiver only mode results when GPS fixes are available, there are enough consistently available satellite vehicles, and more than two satellite vehicles are being tracked; wherein, operation in the DR-computer only mode results when a GPS fix is not available, or less than two satellite vehicles are being tracked, and calibration is available; and wherein, operation in the mixed mode results from tests when less than two satellite vehicles are being tracked, or there are not enough consistently available satellite vehicles, and a calibration is available and verified.

4. The vehicle location system of claim 3, further comprising: a programmable persistent stop bit; a conditional program branch that immediately follows a startup of a GPS measurement hardware, and whose conditional branching depends on the status of the programmable persistent stop bit, and that forwards control to said DR-computer only mode if calibration is available and the programmable persistent stop bit is true, or if the programmable persistent stop bit is chaotic that forwards control to said GPS only mode when a GPS fix is available.

5. The vehicle location system of claim 1, further comprising: an automatic process for the continual calibration of estimates for the true radii of each of said individual wheels, wherein absolute position information periodically obtained from the GPS receiver is compared to said rotational data provided by wheel-tick sensors.

6. The vehicle location system of claim 1, further comprising: a buffer and time-stamp process for receiving packets of wheel-tick rotational data received from a controller-area network (CAN); and a dead-reckoning Kalman filter for estimating and calibrating said wheel-tick rotational data from the buffer and time-stamp process.

7. The vehicle location system of claim 1, further comprising: an initializing value calculated to approximate the true radii of each of said individual wheels, and used to provide delta-range, delta-heading, and delta-heading sum estimates for dead-reckoning location solutions.

8. The vehicle location system of claim 1, further comprising: a speed-effect compensation to adjust estimates of wheel radii.

9. A GPS, dead-reckoning, and map matching location software application program for execution as a GPS application in a host computer, comprising: an input process for collecting time, fix trigger, Doppler, and pseudorange reports from a GPS measurement platform (MP) device mounted aboard a vehicle with wheels; a GPS-time to host computer time offset calculation process for aligning otherwise asynchronous data generated by said vehicle to GPS time; a least squares snapshot estimator for position (P), velocity (V), calibration parameters for the wheel radii and ratio (B), delta-heading and delta-range (D), and time based on each new position fix and GPS system time; a Kalman Filter configured for position (P), velocity (V), calibration parameters for the wheel radii and ratio (B), delta-heading and delta-range (D), and time, and for processing dead-reckoning delta-range, delta-heading, mixed modes, and propagation; a continuous mode selection process for operating in a GPS only mode, dead-reckoning only mode, or a mixed mode of both GPS and dead-reckoning, depending on an availability of GPS solutions and wheel data calibrations; a new fix computation process for computing hardware preposition data and adjusting a GPS millisecond timer connected to the time offset calculation process; a buffer process for collecting time-stamped CANbus data related to wheel rotation ticks measured by a vehicle's wheel transducers; a dead-reckoning calibration Kalman filter for processing $A_L$ and $A_R$ calibration parameters for delta-heading/tick difference for left and right wheels, and $B_L$, and $B_R$ calibration parameters for delta-range/tick for left and right wheels, and a heading-offset calibration parameter that translates a sum delta-heading to a known heading reference; a dead-reckoning data process for converting data from the buffer process into delta-range, delta-heading, and delta-heading sum information for subsequent processing by the Kalman Filter, and including a dead-reckoning error model; and an applications programming interface (API) for outputting new location fixes.

10. The GPS and dead-reckoning location software application program of claim 9, further comprising: a mode selection program for operating in one of three modes including GPS receiver only, DR-computer only, and a mixed mode including both the GPS receiver and the DR-computer; wherein, operation in the GPS receiver only mode results when GPS fixes are available, there are enough consistently available satellite vehicles, and more than two satellite vehicles are being tracked; wherein, operation in the DR-computer only mode results when a GPS fix is not available, or less than two satellite vehicles are being tracked, and calibration is available; wherein, operation in the mixed mode results from tests when less than two satellite vehicles are being tracked, or there are not enough consistently available satellite vehicles, and a calibration is available and verified; and wherein, new location fixes are thereafter output through the API.

* * * * *